United States Patent
Goodermuth et al.

(10) Patent No.: US 8,583,299 B2
(45) Date of Patent: Nov. 12, 2013

(54) SYSTEM AND METHOD FOR COMMUNICATING DATA IN A TRAIN HAVING ONE OR MORE LOCOMOTIVE CONSISTS

(75) Inventors: Todd Goodermuth, Melbourne, FL (US); David Peltz, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 12/980,555

(22) Filed: Dec. 29, 2010

(65) Prior Publication Data

US 2011/0093144 A1 Apr. 21, 2011

Related U.S. Application Data

(63) Continuation-in-part of application No. 12/683,874, filed on Jan. 7, 2010, now Pat. No. 8,532,850.

(60) Provisional application No. 61/160,930, filed on Mar. 17, 2009.

(51) Int. Cl.
- *G05D 1/00* (2006.01)
- *G05D 3/00* (2006.01)
- *G06F 7/00* (2006.01)
- *G06F 17/00* (2006.01)

(52) U.S. Cl.
USPC ......... 701/19; 701/1; 701/20; 701/24; 701/36

(58) Field of Classification Search
None
See application file for complete search history.

(56) References Cited

U.S. PATENT DOCUMENTS

| | | |
|---|---|---|
| 1,517,549 A | 12/1924 | Espenschied |
| 3,675,196 A | 7/1972 | Molloy |
| 3,694,751 A | 9/1972 | Takahashi |
| 3,714,419 A | 1/1973 | Fosse |
| 3,715,669 A | 2/1973 | LaForest |
| 3,745,933 A | 7/1973 | Eisele et al. |
| 3,750,020 A | 7/1973 | Baba |

(Continued)

FOREIGN PATENT DOCUMENTS

| | | |
|---|---|---|
| DE | 102005057273 A1 | 5/2007 |
| EP | 0829415 A1 | 3/1998 |

(Continued)

OTHER PUBLICATIONS

Search Report and Written Opinion for Corresponding PCT Application No. PCT/US2011/051536, dated Jan. 24, 2012.

(Continued)

*Primary Examiner* — Bhavesh V Amin
(74) *Attorney, Agent, or Firm* — GE Global Patent Operation; John A. Kramer

(57) ABSTRACT

A system for communicating data in a train is provided. The system includes at least one respective router transceiver unit positioned in each of at least two rail vehicles of the train. Each router transceiver unit is coupled to a trainline that extends between the rail vehicles. The trainline is an existing cable bus used in the train for transferring propulsion control data between the rail vehicles that controls at least one of tractive effort or braking effort of the rail vehicles. The router transceiver units are configured to communicate network data over the trainline. In one embodiment, the trainline is an Electrically Controlled Pneumatic (ECP) trainline and the propulsion control data is ECP brake data used to control operations of brakes in the train.

21 Claims, 9 Drawing Sheets

(56) References Cited

U.S. PATENT DOCUMENTS

| | | |
|---|---|---|
| 3,754,209 A | 8/1973 | Molloy |
| 3,815,085 A | 6/1974 | Leclercq |
| 3,835,950 A | 9/1974 | Asano |
| 3,891,965 A | 6/1975 | Schroeder |
| 3,938,129 A | 2/1976 | Smither |
| 3,949,959 A | 4/1976 | Rhoton |
| 4,074,879 A | 2/1978 | Clark |
| 4,207,569 A | 6/1980 | Meyer |
| 4,344,364 A | 8/1982 | Nickles et al. |
| 4,369,942 A | 1/1983 | Wilson |
| 4,420,133 A | 12/1983 | Dietrich |
| 4,442,988 A | 4/1984 | Laurent |
| 4,491,967 A | 1/1985 | Kobayashi |
| 4,498,650 A | 2/1985 | Smith |
| 4,645,148 A | 2/1987 | Kolkman |
| 4,655,421 A | 4/1987 | Jaeger |
| 4,735,385 A | 4/1988 | Nickles et al. |
| 4,910,793 A | 3/1990 | Mainardi |
| 5,019,815 A | 5/1991 | Lemelson |
| 5,056,873 A | 10/1991 | Deno |
| 5,132,682 A | 7/1992 | Higgins |
| 5,208,584 A | 5/1993 | Kaye |
| 5,248,967 A | 9/1993 | Daneshfar |
| 5,289,378 A | 2/1994 | Miller et al. |
| 5,293,632 A | 3/1994 | Novakovich et al. |
| 5,309,155 A | 5/1994 | Hsien |
| 5,317,751 A | 5/1994 | Novakovich et al. |
| 5,330,134 A | 7/1994 | Ehrlich |
| 5,339,782 A | 8/1994 | Golzer |
| 5,342,120 A | 8/1994 | Zimmer |
| 5,353,413 A | 10/1994 | Novakovich et al. |
| 5,491,463 A | 2/1996 | Sargeant |
| 5,507,456 A | 4/1996 | Brown |
| 5,530,328 A | 6/1996 | Fernandez et al. |
| 5,548,815 A | 8/1996 | Takayama |
| 5,581,472 A | 12/1996 | Miller |
| 5,630,565 A | 5/1997 | Lumbis |
| 5,633,629 A | 5/1997 | Hochstein |
| 5,636,907 A | 6/1997 | Okazaki |
| 5,681,015 A * | 10/1997 | Kull .................. 246/187 C |
| 5,749,547 A | 5/1998 | Young |
| 5,787,371 A | 7/1998 | Balukin |
| 5,859,584 A | 1/1999 | Counsell |
| 5,867,404 A | 2/1999 | Bryan |
| 5,870,016 A | 2/1999 | Shrestha |
| 5,901,683 A | 5/1999 | Patel |
| 5,928,294 A | 7/1999 | Zelinkovsky |
| 5,950,966 A | 9/1999 | Hungate |
| 6,032,905 A | 3/2000 | Haynie |
| 6,102,340 A | 8/2000 | Peek |
| 6,163,089 A | 12/2000 | Kull |
| 6,203,343 B1 | 3/2001 | Chevassus-More et al. |
| 6,216,985 B1 | 4/2001 | Stephens |
| 6,217,126 B1 | 4/2001 | Kull |
| 6,225,919 B1 | 5/2001 | Lumbis et al. |
| 6,229,452 B1 | 5/2001 | Kull |
| 6,283,765 B1 | 9/2001 | Lumbis et al. |
| 6,313,589 B1 | 11/2001 | Kobayashi |
| 6,317,031 B1 | 11/2001 | Rickard |
| 6,324,659 B1 | 11/2001 | Pierro |
| 6,330,499 B1 | 12/2001 | Chou et al. |
| 6,384,735 B1 | 5/2002 | Rabou |
| 6,400,281 B1 | 6/2002 | Darby, Jr. |
| 6,401,015 B1 | 6/2002 | Stewart et al. |
| 6,435,624 B1 * | 8/2002 | Kull et al. .................. 303/15 |
| 6,445,150 B1 | 9/2002 | Tanner |
| 6,452,482 B1 | 9/2002 | Cern |
| 6,456,908 B1 | 9/2002 | Kumar |
| 6,463,367 B2 | 10/2002 | Neff |
| 6,487,478 B1 | 11/2002 | Azzaro |
| 6,504,485 B2 | 1/2003 | Jinno |
| 6,574,748 B1 | 6/2003 | Andress et al. |
| 6,582,031 B2 | 6/2003 | Newton et al. |
| 6,688,561 B2 | 2/2004 | Mollet |
| 6,759,871 B2 | 7/2004 | Nguyen |
| 6,830,224 B2 | 12/2004 | Lewin |
| 6,839,664 B1 | 1/2005 | Kull |
| 6,856,865 B2 | 2/2005 | Hawthorne |
| 6,862,502 B2 | 3/2005 | Peltz |
| 6,885,854 B2 | 4/2005 | Stewart |
| 6,977,578 B2 | 12/2005 | Kline |
| 6,980,127 B2 | 12/2005 | Lumbis |
| 7,004,550 B2 | 2/2006 | Root et al. |
| 7,006,012 B2 | 2/2006 | Taoka |
| 7,021,588 B2 | 4/2006 | Hess, Jr. |
| 7,029,076 B2 | 4/2006 | Root et al. |
| 7,038,597 B2 | 5/2006 | Smith |
| 7,042,351 B2 | 5/2006 | Kline |
| 7,062,381 B1 | 6/2006 | Rekow et al. |
| 7,069,123 B2 | 6/2006 | Lapointe |
| 7,072,408 B2 | 7/2006 | Gehlot |
| 7,072,747 B2 | 7/2006 | Armbruster |
| 7,075,414 B2 | 7/2006 | Giannini |
| 7,076,343 B2 | 7/2006 | Kornick |
| 7,079,926 B2 | 7/2006 | Kane |
| 7,140,577 B2 | 11/2006 | Mollet |
| 7,143,017 B2 | 11/2006 | Flynn |
| 7,162,337 B2 | 1/2007 | Peltz |
| 7,164,368 B1 | 1/2007 | Ireland |
| 7,222,003 B2 | 5/2007 | Stull |
| 7,236,765 B2 | 6/2007 | Bonicatto |
| 7,257,471 B2 | 8/2007 | Kornick |
| 7,264,208 B2 | 9/2007 | Kovach |
| 7,302,895 B2 | 12/2007 | Kumar |
| 7,333,027 B2 | 2/2008 | Bourgault |
| 7,336,156 B2 | 2/2008 | Arita |
| 7,356,389 B2 | 4/2008 | Holst |
| 7,467,032 B2 | 12/2008 | Kane |
| 7,494,194 B2 | 2/2009 | Higgs et al. |
| 7,532,604 B2 | 5/2009 | Eglin |
| 7,618,011 B2 * | 11/2009 | Oleski et al. .................. 246/167 R |
| 7,653,465 B1 | 1/2010 | Geiger |
| 7,664,459 B2 | 2/2010 | Smith, Jr. |
| 7,667,344 B2 | 2/2010 | Zitting |
| 7,673,568 B2 | 3/2010 | Marra et al. |
| 7,688,218 B2 | 3/2010 | Lefebvre |
| 7,725,252 B2 | 5/2010 | Heddebaut et al. |
| 7,948,398 B2 | 5/2011 | Miller |
| 7,994,937 B2 | 8/2011 | Hsu |
| 2001/0044681 A1 | 11/2001 | Diana |
| 2001/0044695 A1 | 11/2001 | Doner |
| 2002/0087578 A1 | 7/2002 | Vroman |
| 2002/0186670 A1 | 12/2002 | Fuster Rufilanchas |
| 2003/0009274 A1 | 1/2003 | Peterson, Jr. |
| 2003/0021441 A1 | 1/2003 | Levy |
| 2003/0034423 A1 | 2/2003 | Hess, Jr. |
| 2003/0087543 A1 | 5/2003 | Hess |
| 2003/0094545 A1 | 5/2003 | Smith |
| 2003/0137191 A1 | 7/2003 | Smith |
| 2003/0151520 A1 | 8/2003 | Kraeling |
| 2003/0210671 A1 | 11/2003 | Eglin |
| 2003/0213875 A1 | 11/2003 | Hess et al. |
| 2003/0214417 A1 * | 11/2003 | Peltz et al. .................. 340/825 |
| 2003/0223387 A1 | 12/2003 | Davenport et al. |
| 2004/0084957 A1 | 5/2004 | Root et al. |
| 2004/0104312 A1 | 6/2004 | Hess, Jr. |
| 2005/0076716 A1 | 4/2005 | Turner |
| 2005/0125112 A1 | 6/2005 | LaDuc et al. |
| 2005/0125113 A1 | 6/2005 | Wheeler et al. |
| 2005/0143868 A1 | 6/2005 | Whelan |
| 2005/0143874 A1 | 6/2005 | Peltz |
| 2005/0160169 A1 | 7/2005 | Segal |
| 2005/0189815 A1 | 9/2005 | Bryant |
| 2005/0197748 A1 | 9/2005 | Holst |
| 2005/0228552 A1 | 10/2005 | Kornick |
| 2005/0254818 A1 | 11/2005 | Zhou |
| 2006/0025903 A1 * | 2/2006 | Kumar .................. 701/19 |
| 2006/0085103 A1 | 4/2006 | Smith, Jr. |
| 2006/0138285 A1 | 6/2006 | Oleski et al. |
| 2006/0170285 A1 | 8/2006 | Morimitsu |
| 2006/0180709 A1 | 8/2006 | Breton |
| 2007/0061056 A1 | 3/2007 | Valsorda |
| 2007/0173989 A1 | 7/2007 | Walker |
| 2007/0228813 A1 | 10/2007 | Smith |

(56) References Cited

U.S. PATENT DOCUMENTS

| | | |
|---|---|---|
| 2007/0236079 A1 | 10/2007 | Kull |
| 2007/0241610 A1 | 10/2007 | Smith |
| 2008/0033605 A1 | 2/2008 | Daum |
| 2008/0087772 A1 | 4/2008 | Smith |
| 2008/0112473 A1 | 5/2008 | Refaeli et al. |
| 2008/0159281 A1 | 7/2008 | Jesseph |
| 2008/0173770 A1 | 7/2008 | Ruggiero |
| 2008/0195265 A1 | 8/2008 | Searle |
| 2009/0037038 A1 | 2/2009 | Mollet et al. |
| 2009/0079560 A1 | 3/2009 | Fries |
| 2009/0158360 A1 | 6/2009 | Diab et al. |
| 2009/0223760 A1 | 9/2009 | Smith |
| 2010/0034298 A1 | 2/2010 | Takahashi et al. |
| 2010/0049384 A1 | 2/2010 | Kraeling |
| 2010/0049830 A1 | 2/2010 | Chenu |
| 2010/0118988 A1 | 5/2010 | Smith |
| 2010/0130124 A1 | 5/2010 | Teeter |
| 2010/0171609 A1 | 7/2010 | Yeldell |
| 2010/0185472 A1 | 7/2010 | Goodermuth |
| 2010/0241295 A1 | 9/2010 | Cooper |
| 2010/0332058 A1 | 12/2010 | Kane |
| 2011/0099413 A1 | 4/2011 | Cooper |
| 2011/0284700 A1 | 11/2011 | Brand |
| 2012/0074266 A1 | 3/2012 | Daum |
| 2012/0078452 A1 | 3/2012 | Daum |
| 2012/0078453 A1 | 3/2012 | Daum |

FOREIGN PATENT DOCUMENTS

| | | |
|---|---|---|
| EP | 1065128 A1 | 1/2001 |
| EP | 1601136 A1 | 11/2005 |
| EP | 1693272 A1 | 8/2006 |
| EP | 1719688 A1 | 11/2006 |
| EP | 1886893 | 2/2008 |
| EP | 1886893 A1 | 2/2008 |
| EP | 1897781 A2 | 3/2008 |
| EP | 2487803 A1 | 8/2012 |
| KR | 10-2011-0039071 | 10/2009 |
| KR | 20110039071 A | 4/2011 |
| WO | 9842096 A2 | 9/1998 |
| WO | 0171942 A2 | 9/2001 |
| WO | 0222425 A1 | 3/2002 |
| WO | 0223503 A1 | 3/2002 |
| WO | 2003098861 A1 | 11/2003 |
| WO | 2005102018 A2 | 11/2005 |
| WO | 2006075767 A2 | 7/2006 |
| WO | 2006134434 A1 | 12/2006 |
| WO | 2007095401 A2 | 8/2007 |
| WO | 2007121043 A1 | 10/2007 |
| WO | 2010059312 A1 | 5/2010 |
| WO | 2011042943 A1 | 4/2011 |

OTHER PUBLICATIONS

Search Report and Written Opinion for corresponding PCT Application No. PCT/US2010/053471, dated Jan. 21, 2011.
Search Report and Written Opinion from corresponding PCT Application No. PCT/US2011/055013, dated Apr. 10, 2012.
Hoerl, F. et al., "Multiple Radio Remote Control of Locomotives in Coupled Trains/Telecommande Multiple Par Radio D'Engins Dans Le Train", vol. 100, No. 3, pp. 105-109, Mar. 1, 2002.
Search Report and Written Opinion from corresponding PCT Application No. PCT/US2012/042675, dated Aug. 10, 2012.
Search Report and Written Opinion from corresponding PCT Application No. PCT/US2012/041858, dated Nov. 30, 2012.
Search Report and Written Opinion from corresponding PCT Application No. PCT/US2011/36159, dated Aug. 30, 2011.
Search Report and Written Opinion from corresponding PCT Application No. PCT/US2011/42476, dated Aug. 31, 2011.
Search Report and Written Opinion from PCT Application No. PCT/US2012/042675 dated Aug. 10, 2012.
Prof. Dr. Hubert Kirrmann (Jan. 20, 1999). "Train Communication Network IEC 61375-4 Wire Train Bus" (powerpoint). Ecole Polytechnique Federale de Lausanne (EPFL).
Prof. Dr. Hubert Kirrmann (Jan. 20, 1999). "Train Communication Network IEC 61375-3 Multifunction Vehicle Bus" (powerpoint). Ecole Polytechnique Fédérale de Lausanne (EPFL).
Informations—und Steuerungstechnik auf Schienenfahrzeugen—Bussysteme im Zug. elektronik industrie 8/9 2008 (in de). InnoTrans Special: Bahnelektronik. Sep. 14, 2008.
"The IEC / IEEE / UIC Train Communication Network for time-critical and safe on-board communication" (powerpoint). Bombardier Transportation. Jun. 10, 2002.
Hubert Kirrmann (ABB Corporate Research); Pierre A. Zuber (DaimlerChrysler Rail Systems). "The IEC/IEEE Train Communication Network" (PDF). IEEE Micro. Mar.-Apr. 2001: 81-92. 0272-1732/01.

* cited by examiner

SYSTEM AND METHOD FOR COMMUNICATING DATA IN A TRAIN HAVING ONE OR MORE LOCOMOTIVE CONSISTS

CROSS-REFERENCE TO RELATED APPLICATIONS

This application is a continuation-in-part of U.S. Nonprovisional patent application Ser. No. 12/683,874, filed Jan. 7, 2010 now U.S. Pat. No. 8,532,850, and entitled "System And Method For Communicating Data In Locomotive Consist Or Other Vehicle Consist" (the "'874 Application"), which claims priority to U.S. Provisional Application Ser. No. 61/160,930, filed on Mar. 17, 2009 (the "'930 Application"). The entire disclosures of the '874 and the '930 Applications are incorporated by reference herein in their entirety.

FIELD OF THE INVENTION

Embodiments of the invention relate to data communications and, more particularly, to data communications in a locomotive consist or other vehicle consist.

BACKGROUND OF THE INVENTION

A locomotive "consist" is a group of two or more locomotives that are mechanically coupled or linked together to travel along a route. Trains may have one or more locomotive consists. Locomotives in a consist include a lead locomotive and one or more trail locomotives. A train will have at least one lead consist, and may also have one or more remote consists positioned further back in the train.

In a locomotive consist, each locomotive includes a connection at each end of the locomotive to couple the power and brake systems of the locomotive to adjacent locomotives such that they function together as a single unit. Each locomotive is connected to subsequent locomotives via a port and jumper cable that includes twenty seven pins on each end. This cable is commonly referred to in the industry as a multiple unit cable or "MU" cable. Two or more of the locomotives in a consist may each include an on-board controller or other electronics. In certain cases, it may be desirable to link the on-board electronics together as a computer network, such that electronics of the lead locomotive in the consist can communicate with electronics of the trail locomotives and thereby form an intra-consist network. This intra-consist network may allow for inherent redundancies in locomotive electronics to be used to improve reliability of locomotives by allowing lead locomotives to utilize electronic equipment contained in trail locomotives of the same consist. It may be easier and more cost effective to use remote electronics in a trail locomotive than providing redundant equipment on each locomotive.

Trains may also include other types of conductive pathways that extend along the length of the train, such as an Electrically Controlled Pneumatic (ECP) trainline, or some other type of cable bus. These conductive pathways may extend through the length of the train between the locomotives and other cars of the train. For example, while the MU cable may couple the locomotives of the train, an ECP trainline may extend between and couple the locomotives with each other and with other railcars, such as passenger cars, commodity cars (or cars that transport non-passenger cargo), and the like. The ECP trainline provides a communication link among the locomotives and the railcars that is used to communicate brake data between the locomotives and the railcars for brake control purposes.

Heretofore, communications in a locomotive consist have been realized using two methods. The first involves wireless communications between the vehicles in the consist using radio equipment. Wireless communications, however, are costly to implement, and are particularly prone to cross talk between connected locomotives and locomotives not physically connected on adjacent tracks. The second method involves running dedicated network cables between the linked locomotives in a consist. However, in most cases this requires retrofitting existing vehicles with additional cables, which is oftentimes cost prohibitive. Additionally, since the cabling is exposed in the separation space between adjacent linked locomotives, the cabling may be prone to failure if the vehicle consist is operated in harsh environmental conditions, e.g., bad weather. Finally, there is additional labor required to connect locomotives with dedicated network cables, and this will require additional training.

BRIEF DESCRIPTION OF THE INVENTION

Embodiments of the present invention relate to a system and method for communicating data in a locomotive consist. "Locomotive consist" refers to a group of locomotives that are mechanically coupled or linked together to travel along a set of one or more rails. In one embodiment of the method, network data is transmitted between a lead locomotive in the locomotive consist and one or more trail locomotives in the locomotive consist. "Network data" refers to data that is packaged in packet form as data packets. Each data packet includes the network address of a recipient computer unit or other electronic component. The network data is transmitted over an existing locomotive multiple unit (MU) cable bus that interconnects the lead locomotive and the trail locomotives. The MU cable bus is an existing electrical bus that is used in the locomotive consist for transferring non-network control information between the lead locomotive and the trail locomotives. (MU "cable bus" refers to the MU cable jumper that actually interconnects adjacent locomotives and/or to the internal electrical system that connects the cable jumper to internal locomotive electronics and the MU ports on either end of a locomotive.) "Non-network" control information refers to command information, used in the locomotive consist for locomotive control purposes, which is not packet data. In another embodiment, non-network control information is not packet data, and does not include recipient network addresses.

In another embodiment, the network data is converted at one of the locomotives into modulated network data for transmission over the MU cable bus. The modulated network data is orthogonal to the non-network control information transferred between the lead and trail locomotives over the MU cable bus. "Orthogonal" means that the modulated network data does not interfere with the non-network control information, and that the non-network control information does not interfere with the modulated network data. At another locomotive in the consist (e.g., a recipient locomotive), the modulated network data is received over the MU cable bus and de-modulated for use by a computer unit or other electronic component in the locomotive.

Another embodiment relates to a communication system for communicating data in a locomotive consist. The system comprises respective router transceiver units positioned in the lead locomotive and each of the trail locomotives in the locomotive consist. The router transceiver units are each electrically coupled to an MU cable bus in the locomotive consist that interconnects the lead locomotive and the trail locomotives. The MU cable bus is an existing cable bus that is used in the locomotive consist for transferring non-network control information between the lead and trail locomotives. The router transceiver units are configured to transmit and/or receive network data over the MU cable bus.

In another embodiment of the communication system, each router transceiver unit is configured to convert the network data into modulated network data for transmission over the MU cable bus, and to de-modulate modulated network data received over the MU cable bus back into network data, for use in communicating data between electronic components in the locomotive consist or otherwise. The modulated network data is orthogonal to the non-network control information transferred between the lead and trail locomotives over the MU cable bus.

A system for communicating data in a train is provided. The system includes at least one respective router transceiver unit positioned in each of at least two rail vehicles of the train. Each router transceiver unit is coupled to a trainline that extends between the rail vehicles. The trainline is an existing cable bus used in the train for transferring propulsion control data between the rail vehicles that controls at least one of tractive effort or braking effort of the rail vehicles. The router transceiver units are configured to communicate network data over the trainline. In one embodiment, the trainline is an Electrically Controlled Pneumatic (ECP) trainline and the propulsion control data is ECP brake data used to control operations of brakes in the train.

In one aspect, the train may be retrofitted to include the system having the router transceiver units coupled with the ECP trainline. For example, an existing train having an existing ECP trainline may be retrofitted with the router transceiver units to permit the communication of network data as inter-consist data or intra-consist data along the ECP trainline in a manner that does not significantly interfere with non-network control information that is normally transmitted using the ECP trainline.

In another embodiment, a method for communicating data in a train is provided. The method includes transferring non-network control information over a trainline that extends along the train in order to control at least one of tractive effort or braking effort of the train. The method also includes transmitting network data between different rail vehicles of the train that are coupled with the trainline. The network data is transmitted over the trainline. In one aspect, the trainline is an ECP trainline and the non-network control information is ECP brake data.

In another embodiment, a system for communicating within a train is provided. The system includes first and second router transceiver units. The First router transceiver unit is disposed on a first rail vehicle of the train. The second router transceiver unit is disposed on a different, second rail vehicle of the train. The first and second router transceiver units are configured to be coupled with a trainline extending along the train between the first and second rail vehicles. The first and second router transceiver units are configured to transmit non-network control information related to operation of the train. The first and second router transceiver units are configured to communicate network data over the trainline that is orthogonal to the non-network control information.

In any of the aforementioned embodiments, the network data may be TCP/IP-formatted data: other communications protocols may be used. Additionally, each locomotive may include computer units or other electronic components communicating with other electronic components in the same consist by transmitting the network data, formatted as TCP/IP data or otherwise, over the MU cable bus, trainline, or ECP trainline, thereby forming a computer network, e.g., an Ethernet-type network.

Any of the aforementioned embodiments are also applicable for communicating data in vehicle consists generally. "Vehicle consist" refers to a group of vehicles that are mechanically coupled or linked together to travel along a route.

BRIEF DESCRIPTION OF THE DRAWINGS

The present invention will be better understood from reading the following description of non-limiting embodiments, with reference to the attached drawings, wherein below.

DETAILED DESCRIPTION OF THE INVENTION

Figure 1:
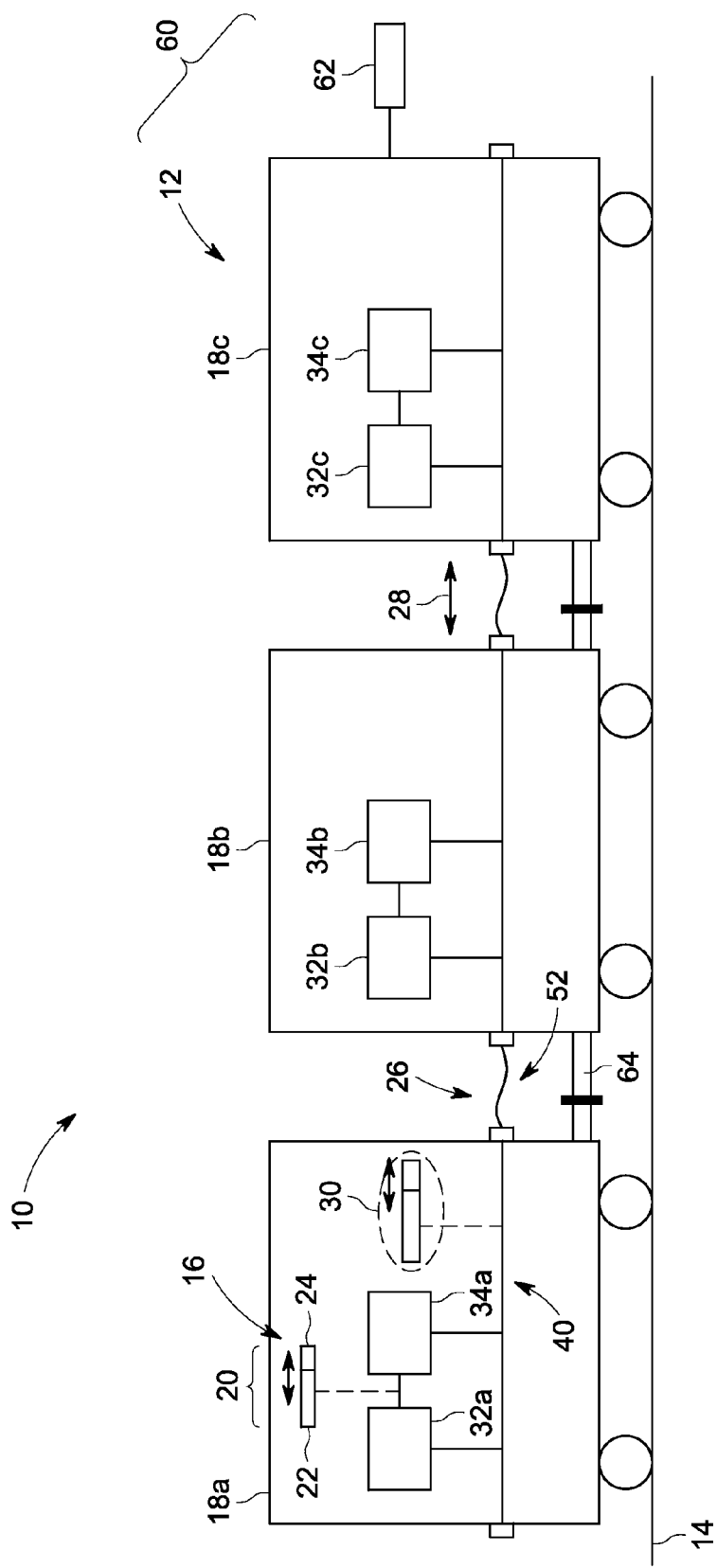
FIG. 1 is a schematic diagram of a communication system for communicating data in a locomotive consist according to an embodiment of the present invention.

With reference to FIG. 1, embodiments of the present invention relate to a communication system 10 and method for communicating data in a locomotive consist 12. "Locomotive consist" refers to a group of locomotives that are mechanically coupled or linked together to travel along a railway 14. In the system 10, network data 16 is transmitted from one locomotive 18a in the consist 12 (e.g., a lead locomotive 18a) to another locomotive 18b in the consist (e.g., a trail locomotive 18b). Each locomotive 18a-18c is adjacent to and mechanically coupled with another locomotive in the consist 12 such that all locomotives in the consist are connected. "Network data" 16 refers to data that is packaged in packet form, meaning a data packet that comprises a set of associated data bits 20. (Each data packet may include a data field 22 and a network address or other address 24 uniquely associated with a computer unit or other electronic component in the consist 12.) The network data 16 is transmitted over a locomotive multiple unit (MU) cable bus 26. The MU cable bus 26 is an existing electrical bus interconnecting the lead locomotive 18a and the trail locomotives 18b, 18c in the consist. The MU cable bus 26 is used in the locomotive consist 12 for transferring non-network control information 28 between locomotives in the consist. "Non-network" control information 28 refers to data or other information, used in the locomotive consist for control purposes, which is not packet data. In another aspect, non-network control information 28 is not packet data, and does not include recipient network addresses.

In another embodiment, as discussed in more detail below, the network data 16 is converted into modulated network data 30 for transmission over the MU cable bus 26. The modulated network data 30 is orthogonal to the non-network control information 28 transferred between locomotives over the MU cable bus 26, to avoid interference. At recipient/subsequent locomotives, the modulated network data 30 is received over the MU cable bus 26 and de-modulated for use by a locomotive electronic component 32a, 32b, 32c. For these functions, the communication system 10 may comprise respective router transceiver units 34a, 34b, 34c positioned in the lead locomotive 18a and each of the trail locomotives 18b, 18c in the locomotive consist 12.

By using an existing inter-vehicle cable bus for transmitting network data between locomotives, the system and method of the present invention avoids interference and other problems associated with wireless transmissions, and obviates the need to specially outfit the locomotives with dedicated network cables.

Figure 2:
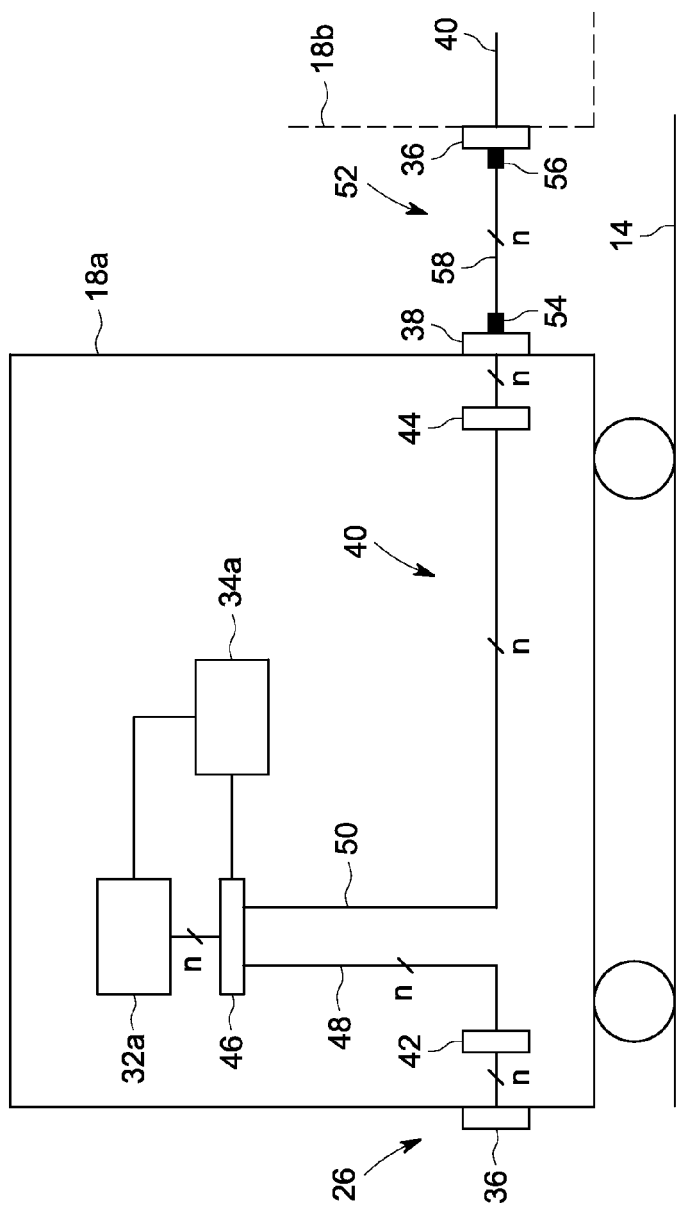
FIG. 2 is a schematic diagram of an MU cable bus in a locomotive, shown in the context of the communication system of FIG. 1.

One example of an MU cable bus 26 is shown in more detail in FIG. 2. Other configurations are possible, depending on the type of locomotive involved. As noted above, the MU cable bus 26 is an existing electrical bus interconnecting the lead locomotive 18a and the trail locomotives 18b, 18c in the consist. In each locomotive, e.g., the lead locomotive 18a as shown in FIG. 2, the MU cable bus 26 comprises a front MU port 36, a rear MU port 38, and an internal MU electrical system 40 that connects the front port 36 and the rear port 38 to one or more electronic components 32a of the locomotive 18a. In the illustrated example, the internal MU electrical system 40 comprises a front terminal board 42 electrically connected to the front MU port 36, a rear terminal board 44 electrically connected to the rear MU port 38, a central terminal board 46, and first and second electrical conduit portions 48, 50 electrically connecting the central terminal board 46 to the front terminal board 42 and the rear terminal board 44, respectively. The one or more electronic components 32a of the locomotive 18a may be electrically connected to the central terminal board 46, and thereby to the MU cable bus 26 generally. Although the front MU port 36 and rear MU port 38 may be located generally at the front and rear of the locomotive 18a, this is not always the case, and designations such as "front," "rear," "central," etc. are not meant to be limiting but are instead provided for identification purposes.

Figure 3:
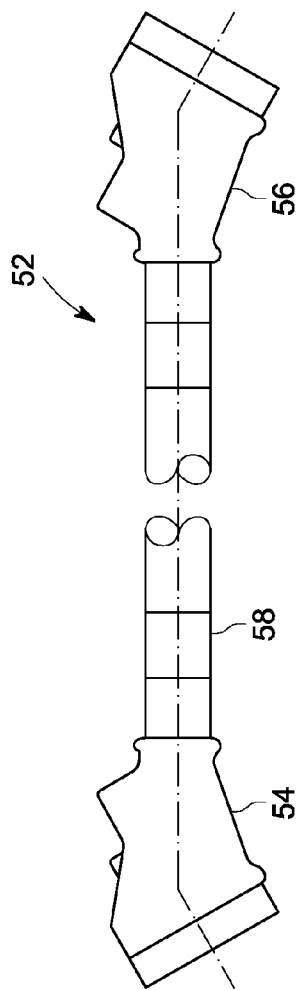
FIGS. 3 and 7 are schematic diagram of MU cable jumpers.

As shown in FIGS. 2 and 3, the MU cable bus 26 further comprises an MU cable jumper 52. The jumper 52 comprises first and second plug ends 54, 56 and a flexible cable portion 58 electrically and mechanically connecting the plug ends together. The plug ends 54, 56 fit into the MU ports 36, 38. The MU cable jumper 52 may be electrically symmetrical, meaning either plug end can be attached to either port. The MU cable jumper 52 is used to electrically interconnect the internal MU electrical systems 40 of adjacent locomotives 18a, 18b. As such, for each adjacent pair of locomotives 18a, 18b, one plug end 54 of an MU cable jumper 52 is attached to the rear MU port 28 of the front locomotive 18a, and the other plug end 56 of the MU cable jumper 52 is attached to the front MU port 36 of the rear locomotive 18b. The flexible cable portion 58 of the MU cable jumper 52 extends between the two plug ends, providing a flexible but secure electrical connection between the two locomotives 18a, 18b.

Depending on the particular type and configuration of locomotive, the electrical conduit portions 48, 50 and MU cable jumpers 52 may be configured in different manners, in terms of the number "n" ("n" is a real whole number equal to or greater than 1) and type of discreet electrical pathways included in the conduit or jumper. In one example, each conduit portion 48, 50 and the jumper cable portion 58 comprises a plurality of discreet electrical wires, such as 12-14 gauge copper wires. In another example, the cable portion 58 (of the MU cable jumper 52) comprises a plurality of discreet electrical wires, while the conduit portions 48, 50 each include one or more discreet electrical wires and/or non-wire electrical pathways, such as conductive structural components of the locomotive, pathways through or including electrical or electronic components, circuit board traces, or the like. Although certain elements in FIG. 2 are shown as including "n" discreet electrical pathways, it should be appreciated that the number of discreet pathways in each element may be different, i.e., "n" may be the same or different for each element.

As noted, the plug ends 54, 56 of the MU cable jumper 52 fit into the MU ports 36, 38. For this purpose, the plug ends and MU ports are complementary in shape to one another, both for mechanical and electrical attachment. The plug end 54, 56 may include a plurality of electrical pins, each of which fits into a corresponding electrical socket in an MU port. The number of pins and sockets may depend on the number of discreet electrical pathways extant in the internal electrical conduits 40, MU cable jumpers 52, etc. In one example, each plug end 54, 56 is a twenty seven-pin plug.

The central terminal board 46, front terminal board 42, and rear terminal board 44 each comprise an insulating base (attached to the locomotive) on which terminals for wires or cables have been mounted. This provides flexibility in terms of connecting different electronic components to the MU cable bus.

The MU cable bus 26 is used in the locomotive consist 12 for transferring non-network control information 28 between locomotives 18a, 18b, 18c in the consist. "Non-network" control information 28 refers to data or other information, used in the locomotive consist for control purposes, which is not packet data. In another example, non-network control information 28 is not packet data, and does not include recipient network addresses. The non-network control information 28 is transmitted over the MU cable bus 26 according to a designated voltage carrier signal (e.g., a 74 volt on/off signal, wherein 0V represents a digital "0" value and +74 volts a digital "1" value, or an analog signal of 0V-74V, wherein the 0-74V voltage level may represent a specific level or percentage of functionality). The non-network control information is transmitted and received using one or more electronic components 32a-32c in each locomotive that are configured for this purpose.

The term "MU cable bus" refers to the entire MU cable bus or any portion(s) thereof, e.g., terminal boards, ports, jumper cable, conduit portions, and the like. As should be appreciated, when two locomotives are connected via an MU cable jumper 52, both the MU cable jumper 52 and the internal MU electrical systems 40 of the two locomotives together form the MU cable bus. As subsequent locomotives are attached using additional MU cable jumpers 52, those cable jumpers and the internal MU electrical systems 40 of the subsequent locomotives also become part of the MU cable bus.

As indicated in FIG. 1, the locomotive consist 12 may be part of a train 60 that includes the locomotive consist 12, a plurality of railcars 62, and possibly additional locomotives or locomotive consists (not shown). Each locomotive 18a-18c in the consist 12 is mechanically coupled to at least one other, adjacent locomotive in the consist 12, through a coupler 64. The railcars 62 are similarly mechanically coupled together and to the locomotive consist to form a series of linked vehicles. The non-network control information may be used for locomotive control purposes or for other control purposes in the train 60.

As discussed above, the communication system 10 may comprise respective router transceiver units 34*a*, 34*b*, 34*c* positioned in the lead locomotive 18*a* and each of the trail locomotives 18*b*, 18*c* in the locomotive consist 12. The router transceiver units 34*a*, 34*b*, 34*c* are each electrically coupled to the MU cable bus 26. The router transceiver units 34*a*, 34*b*, 34*c* are configured to transmit and/or receive network data 16 over the MU cable bus 26. In one embodiment, each router transceiver unit receives network data 16 from a computer unit or other electronic component 32*a*, 32*b*, 32*c* in the locomotive consist 12, and modulates the received network data 16 into modulated network data 30 for transmission over the MU cable bus 26. Similarly, each router transceiver unit 34*a*, 34*b*, 34*c* receives modulated network data 30 over the MU cable bus 26 and de-modulates the received modulated network data 30 into network data 16, "Modulated" means converted from one form to a second, different form suitable for transmission over the MU cable bus 26. "De-modulated" means converted from the second form back into the first form. The modulated network data 30 is orthogonal to the non-network control information 28 transferred between locomotives over the MU cable bus 26. "Orthogonal" means that the modulated network data does not interfere with the non-network control information, and that the non-network control information does not interfere with the modulated network data (at least not to the extent that would corrupt the data). At recipient/subsequent locomotives, the modulated network data 30 is received over the MU cable bus 26 and de-modulated back into the network data 16 for use by a locomotive electronic component 32*a*, 32*b*, 32*c*.

The network data 16 is data that is packaged in packet form, meaning a data packet that comprises a set of associated data bits 20. Each data packet 20 may include a data field 22 and a network address or other address 24 uniquely associated with a computer unit or other electronic component 32*a*-32*c* in the consist 12. The network data 16 may be TCP/IP-formatted or SIP-formatted data, however, the electronic components and/or router transceiver units may use other communications protocols for communicating network data. As should be appreciated, the MU cable bus 26, electronic component 32*a*-32*c*, and router transceiver units 34*a*-34*c* together form a local area network. In one embodiment, these components are configured to form an Ethernet network.

Figure 4:
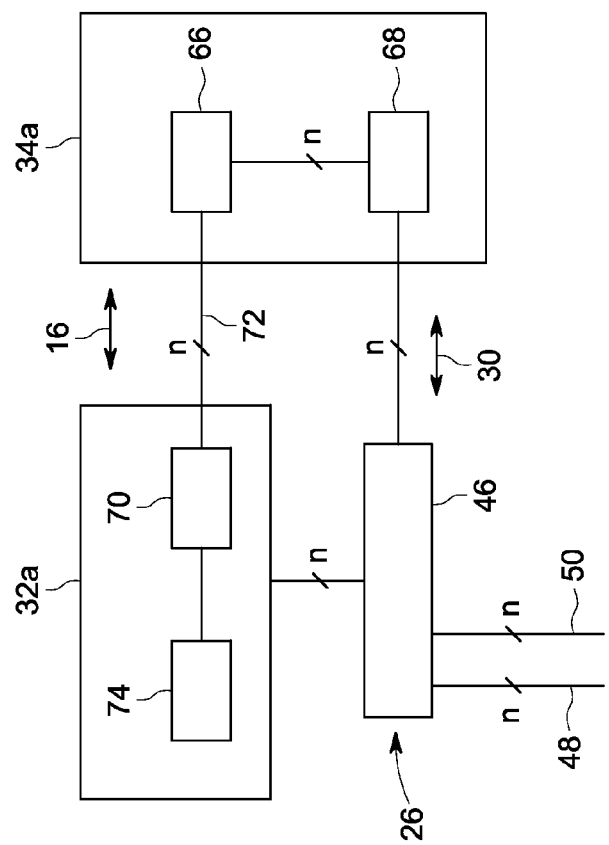
FIG. 4 is a schematic diagram of a router transceiver unit according to an embodiment of the present invention.

FIG. 4 shows one embodiment of a router transceiver unit 34*a* in more detail. The router transceiver unit 34*a* comprises a network adapter module 66 and a signal modulator module 68. The signal modulator module 68 is electrically connected to the network adapter module 66 and to the MU cable bus 26. In the example shown in FIG. 4, the signal modulator module 68 is electrically connected to the MU cable bus 26 by way of the central terminal board 46, near a locomotive electronic component 32*a*. The network adapter module 66 is electrically connected to a network interface unit 70 that is part of and/or operably connected to the electronic component 32*a*. (The electronic component 32*a* may be, for example, a computer unit for controlling a locomotive.) The network adapter module 66 and network interface unit 70 are electrically interconnected by a network cable 72. For example, if the network adapter module 66 and network interface unit 70 are configured as an Ethernet local area network, the network cable 72 may be a CAT-5E cable. The network interface unit 70 is functionally connected to one or more software or hardware applications 74 in the electronic component 32*a* that are configured for network communications. In one embodiment, the network interface unit 70, network cable 72, and software or hardware applications 74 include standard Ethernet-ready (or other network) components. For example, if the electronic component 32*a* is a computer unit, the network interface unit 70 may be an Ethernet adapter connected to computer unit for carrying out network communications.

The network adapter module 66 is configured to receive network data 16 from the network interface unit 70 over the network cable 72. The network adapter module 66 conveys the network data 16 to the signal modulator module 68, which modulates the network data 16 into modulated network data 30 and transmits the modulated network data 30 over the MU cable bus 26. The signal modulator module 68 also receives modulated network data 30 from over the MU cable bus 26 and de-modulates the modulated network data 30 into network data 16, which it then conveys to the network adapter module 66 for transmission to the network interlace unit 70. One or both of the network adapter module 66 and the signal modulator module 68 may perform various processing steps on the network data 16 and/or the modulated network data 30 for transmission and reception both over the MU cable bus 26 and/or over the network cable 72 (to the network interface unit 70). Additionally, one both of the network adapter module 66 and the signal modulator module 68 may perform network data routing functions.

The signal modulator module 68 includes an electrical output (e.g., port, wires) for electrical connection to the MU cable bus 26, and internal circuitry (e.g., electrical and isolation components, microcontroller, software/firmware) for receiving network data 16 from the network adapter module 66, modulating the network data 16 into modulated network data 30, transmitting the modulated network data 30 over the MU cable bus 26, receiving modulated network data 30 over the MU cable bus 26, de-modulating the modulated network data 30 into network data 16, and communicating the network data 16 to the network adapter module 66. The internal circuitry may be configured to modulate and de-modulate data using schemes such as those utilized in VDSL or VHDSL (very high bitrate digital subscriber line) applications, or in power line digital subscriber line (PDSL) applications. One example of a suitable modulation scheme is orthogonal frequency-division multiplexing (OFDM). OFDM is a frequency-division multiplexing scheme wherein a large number of closely-spaced orthogonal sub-carriers are used to carry data. The data is divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth. The modulation or communication scheme may involve applying a carrier wave (at a particular frequency orthogonal to frequencies used for non-network data in the MU cable bus) and modulating the carrier wave using digital signals corresponding to the network data 16.

Figure 5:
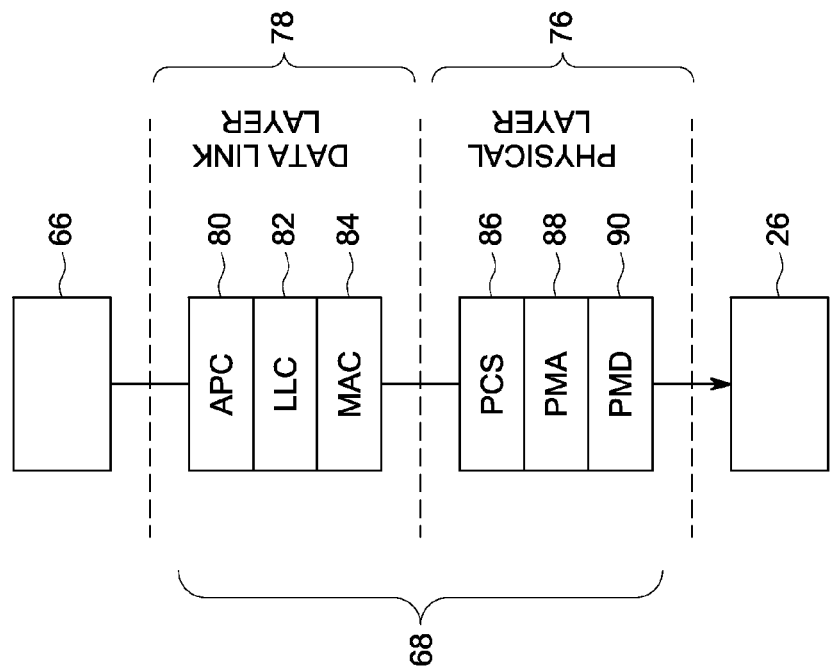
FIG. 5 is a schematic diagram illustrating the functionality of a signal modulator module portion of a router transceiver unit, according to an embodiment of the present invention.

FIG. 5 shows one possible example of how the signal modulator module 68 could function, cast in terms of the OSI network model, according to one embodiment of the present invention. In this example, the signal modulator module 68 includes a physical layer 76 and a data link layer 78. The data link layer 78 is divided into three sub-layers. The first sub-layer is an application protocol convergence (APC) layer 80. The APC layer accepts Ethernet (or other network) frames 16 from an upper application layer (e.g., the network adapter module 66) and encapsulates them into MAC (medium access control) service data units, which are transferred to a logical link control (LLC) layer 82. The LLC layer 82 is responsible for potential encryption, aggregation, segmentation, automatic repeat-request, and similar functions. The third sub-layer of the data link layer 78 is a MAC layer 84, which schedules channel access. The physical layer 76 is divided into three sub-layers. The first sub-layer is a physical coding sub-layer (PCS) 86, which is responsible for generating PHY (physical layer) headers. The second sub-layer is a physical medium attachment (PMA) layer 88, which is responsible for scrambling and FEC (forward error correction) coding/decoding. The third sub-layer is a physical medium dependent (PMD) layer 90, which is responsible for bit-loading and OFDM modulation. The PMD layer 90 is configured for interfacing with the MU cable bus 26, according to the particular configuration (electrical or otherwise) of the MU cable bus. The other sub-layers are medium independent, i.e., do not depend on the configuration of the MU cable bus.

Figure 6:
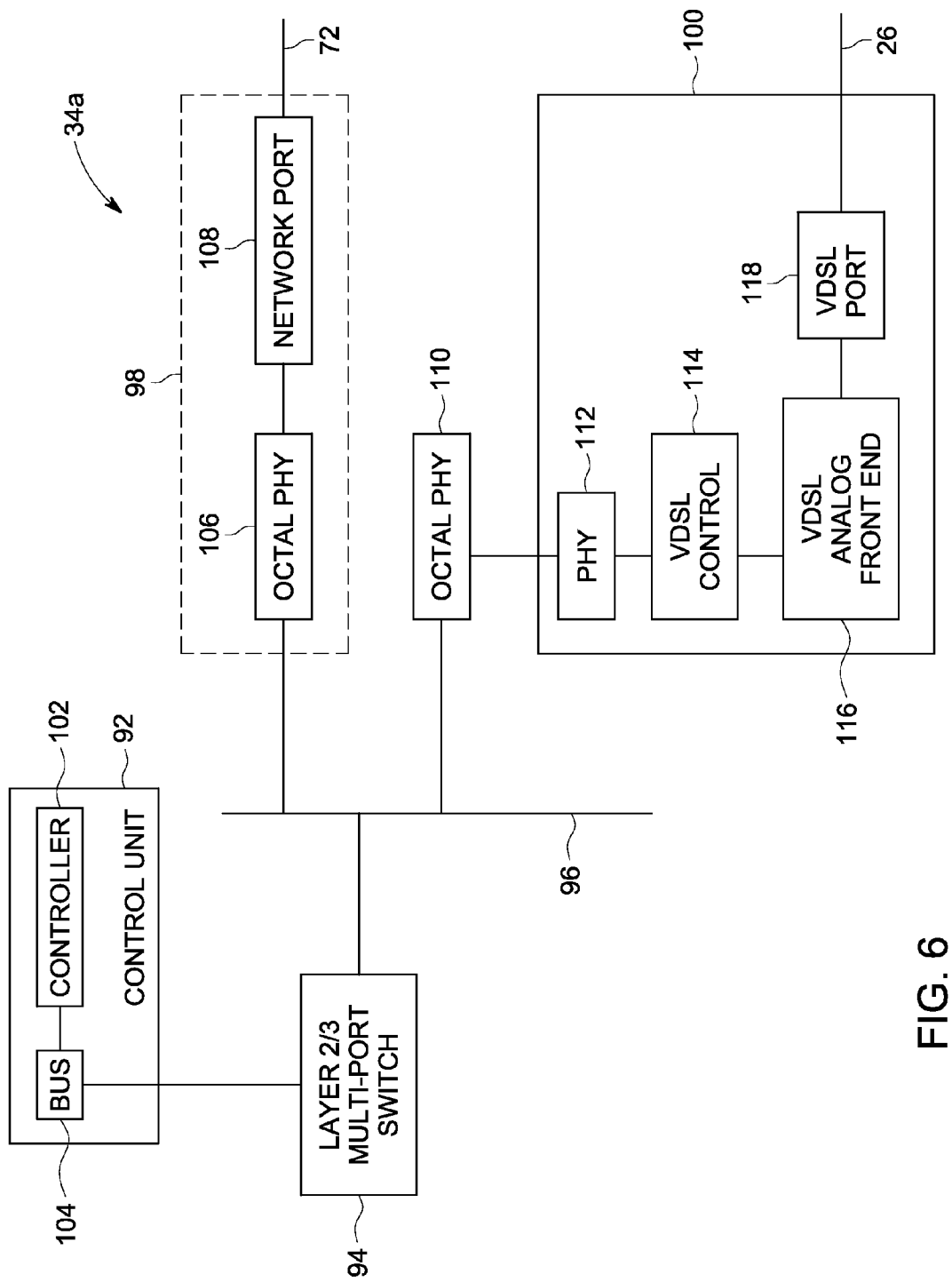
FIG. 6 is a circuit diagram of another embodiment of a router transceiver unit.

FIG. 6 is a circuit diagram of another embodiment of a router transceiver unit 34*a*. In this embodiment, the router transceiver unit 34*a* comprises a control unit 92, a switch 94, a main bus 96, a network interface portion 98, and a VDSL module 100. The control unit 92 comprises a controller 102 and a control unit bus 104. The controller 102 is electrically connected to the control unit bus 104 for communicating data over the bus 104. The controller 102 may be a microcontroller or other processor-based unit, including support circuitry for the microcontroller. The switch 94 is a network switching/router module configured to process and route packet data and other data. The switch 94 interfaces the control unit 92 with the main bus 96. The switch 94 may be, for example, a layer 2/3 multi-port switch. The network interface portion 98 is electrically connected to the main bus 96, and comprises an octal PHY (physical layer) portion 106 and a network port portion 108. The network port portion 108 is electrically connected to the octal PHY portion 106. The octal PHY portion 106 may comprise a 10/100/1000 Base T 8-port Ethernet (or other network) transceiver circuit. The network port portion 108 may comprise an Ethernet (or other network) transformer and associated CAT-5E receptacle (or other cable type receptacle) for receiving a network cable 72.

The VDSL module 100 is also connected to the main bus 96 by way or an octal PHY unit 110, which may be the same unit as the octal PHY portion 106 or a different octal PHY unit. The VDSL module 100 comprises a physical interface portion (PHY) 112 electrically connected to the octal PHY unit 110, a VDSL control 114 electrically connected to the physical interface portion 112, a VDSL analog front end unit 116 electrically connected to the VDSL control 114, and a VDSL port unit 118 electrically connected to the VDSL analog front end unit 116. The physical interface portion 112 acts as a physical and electrical interface with the octal PHY unit 110, e.g., the physical interface portion 112 may comprise a port and related support circuitry. The VDSL analog front end unit 116 is configured for transceiving modulated network data 30 (e.g., sending and receiving modulated data) over the MU cable bus 26, and may include one or more of the following: analog filters, line drivers, analog-to-digital and digital-to-analog converters, and related support circuitry (e.g., capacitors). The VDSL control 114 is configured for converting and/or processing network data 16 for modulation and de-modulation, and may include a microprocessor unit, ATM (asynchronous transfer mode) and IP (Internet Protocol) interfaces, and digital signal processing circuitry/functionality. The VDSL port unit 118 provides a physical and electrical connection to the MU cable bus 26, and may include transformer circuitry, circuit protection functionality, and a port or other attachment or connection mechanism for connecting the VDSL module 100 to the MU cable bus 26. Overall operation of the router transceiver unit 34*a* shown in FIG. 6 is similar to what is described in relation to FIGS. 1, 2, and 4.

Another embodiment of the invention relates to a method for communicating data in a locomotive consist 12. The method comprises transmitting network data 16, 30 between locomotives 18*a*-18*c* within a locomotive consist 12. (Each locomotive 18*a*-18*c* is adjacent to and mechanically coupled with one or more other locomotives in the consist.) The network data 16, 30 is transmitted over a locomotive multiple unit (MU) cable bus 26 interconnecting at least adjacent locomotives 18*a*, 18*b* in the consist 12. The MU cable bus 12 is an existing cable bus used in the locomotive consist 12 for transferring non-network control information 28 between locomotives 18*a*-18*c* in the consist 12.

In another embodiment, the method further comprises, at each of one or more of the locomotives 18*a*-18*c* in the locomotive consist 12, converting the network data 16 into modulated network data 30 for transmission over the MU cable bus 26. The modulated network data 30 is orthogonal to the non-network control information 28 transferred over the MU cable bus. The method further comprises de-modulating the modulated network data 30 received over the MU cable bus 26 for use by on-board electronic components 32*a*-32*c* of the locomotives.

As should be appreciated, it may be the case that certain locomotives in a consist are network equipped according to the system and method of the present invention, e.g., outfitted with a router transceiver unit, and that other locomotives in the consist are not. For example, there may be first and third network-equipped locomotives physically separated by a second locomotive that is not network equipped. In this case, the first and third locomotives are still able to communicate and exchange data even though there is a non-network equipped locomotive between them. This is possible because all the locomotives are still electrically connected via the MU cable bus. In one case, for example, a locomotive consist comprises first, second, and third locomotives, with the second locomotive being disposed between the first and third locomotives. A first router transceiver unit is positioned in the first locomotive, and a second router transceiver unit is positioned in the third locomotive. The second locomotive, however, does not have a router transceiver unit or other functionality for transmitting and/or receiving network data over the MU cable bus. Nevertheless, network data is transmitted between the first and third locomotives through the second locomotive, with the network data passing through a portion of the MU cable bus in the second locomotive but not being transmitted or received by the second locomotive.

In another embodiment, the method further comprises controlling at least one of the locomotives 18*a*-18*c* in the consist based at least in part on the network data 16.

The locomotive consist 12 may be part of a train 60 that comprises the locomotive consist 12 and a plurality of railcars 62. Here, the non-network control information 28 may be train control information that is transmitted over the MU cable bus according to a designated voltage carrier signal (e.g., +74V).

Figure 7:
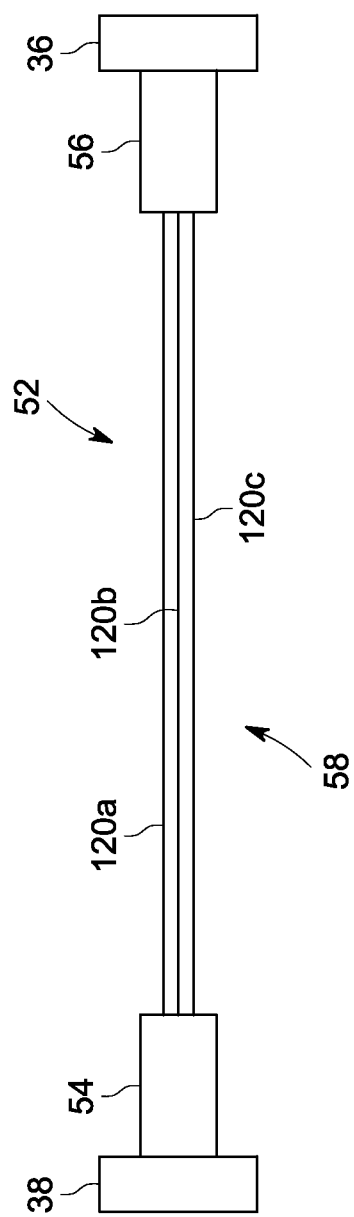

With reference to FIG. 7, if the MU cable jumper 52 and/or internal electrical system 40 includes plural discreet electrical wires or other electrical pathways, e.g., three discreet electrical wires 120*a*-120*c* as shown in FIG. 7, it may be the case that network data 30 is transmitted over only one of the plural discreet electrical wires or other electrical pathways. This may depend on what each pathway is used for in the locomotive consist and what type of information it carries. For example, it may be undesirable to transmit network data over a wire 120*a* that carries analog non-network data, whereas a wire 120*b* that carries a digital signal (on +V, off 0V) is more desirable for transmitting network data.

Another embodiment of the present invention relates to a communication system 10 for communicating data in a locomotive consist 12. The system 10 comprises a respective router transceiver unit 34*a*-34*c* positioned in each locomotive 18*a*-18*c* of a locomotive consist 12. Each router transceiver unit 34*a*-34*c* is coupled to a locomotive multiple unit (MU) cable bus 26 in the locomotive consist 12 that interconnects adjacent locomotives 18*a*, 18*b*. The MU cable bus 16 is an existing cable bus used in the locomotive consist for transferring non-network control information 28 between locomotives within the locomotive consist. Each router transceiver unit 34*a*-34*c* is configured to transmit and/or receive network data 16, 30 over the MU cable bus 26.

In another embodiment of the system 10, each router transceiver unit 34*a*-34*c* is configured to convert the network data 16 into modulated network data 30 for transmission over the MU cable bus 26. The modulated network data being orthogonal to the non-network control information transferred between locomotives over the MU cable bus. Each router transceiver unit is further configured to de-modulate the modulated network data received over the MU cable bus for use by electronic components in the locomotives of the consist.

Another embodiment relates to a communication system for communicating data in a locomotive consist 12. In this embodiment, the system comprise a respective router transceiver unit 34*a*-34*c* positioned in each of a plurality of locomotives 18*a*-18*c* in the consist 12. The system further comprises, in each of the plurality of locomotives, a respective electronic component 32*a*-32*c* (e.g., computer unit) positioned in the locomotive and operably coupled to the router transceiver unit in the locomotive. The router transceiver units 34*a*-34*c* are electrically coupled to a locomotive multiple unit (MU) cable bus 26, which is an existing cable bus used in the consist for transferring non-network control information 28 between the plurality of locomotives. The router transceiver units 34*a*-34*c* are configured to transmit and/or receive network data 16, 30 over the MU cable bus 16, the network data originating at one of electronic components 32*a*-32*c* and being addressed to another of the electronic components 32*a*-32*c*. Each router transceiver unit may be configured to convert the network data into modulated network data for transmission over the MU cable bus (the modulated network data being orthogonal to the non-network control information transferred between locomotives over the MU cable bus), and to de-modulate the modulated network data received over the MU cable bus for use in one of the electronic components.

Another embodiment relates to a communication system for communicating data in a locomotive consist 12. The system comprises a computer network in the consist. The computer network comprises a respective electronic component 32*a*-32*c* positioned in each of a plurality of locomotives 18*a*-18*c* in the consist 12 and a locomotive multiple unit (MU) cable bus 26. The MU cable bus 26 interconnects the electronics components and is an existing cable bus used in the consist for transferring non-network control information 28 between the locomotives. The electronic components are configured to communicate by transmitting network data 16, 30 over the MU cable bus 26, the network data 16 originating at one of the electronic components and being addressed to another of the electronic components. As should be appreciated, in this embodiment the electronic components are configured to can out the functionality of the router transceiver units 34*a*-34*c* as described above, and/or the router transceiver units 34*a*-34*c* are part of (or comprise) the electronic components. The computer network may be an Ethernet network.

Another embodiment relates to a method for retrofitting a locomotive for network data communications. The method comprises outfitting a locomotive with a router transceiver unit, interfacing the router transceiver unit with an electronic component of the locomotive, and interfacing the router transceiver unit with a multiple unit (MU) cable bus of the locomotive. The MU cable bus is an existing cable bus used for transferring non-network control information between locomotives in a consist. The router transceiver unit is configured to transmit and/or receive network data over the MU cable bus.

Another embodiment relates to a method for retrofitting a locomotive consist for network data communications. The method comprises, at each of a plurality of locomotives 18*a*-18*c* in a consist 12, outfitting the locomotive with a respective router transceiver unit 34*a*-34*c*, interfacing the router transceiver unit 34*a*-34*c* with an electronic component 32*a*-32*c* of the locomotive, and interfacing the router transceiver unit 34*a*-34*c* with a multiple unit (MU) cable bus 26 of the locomotive. The MU Cable bus is an existing cable bus used for transferring non-network control information between locomotives in the consist. Each router transceiver unit is configured to transmit and/or receive network data 16, 30 over the MU cable bus 26.

Any of the embodiments described herein are also applicable for communicating data in vehicle consists generally. "Vehicle consist" refers to a group of vehicles that are mechanically coupled or linked together to travel along a route.

For example, one embodiment of the present invention relates to a system and method for communicating data in a vehicle consist 12. In this embodiment, network data 16, 30 is transmitted from a first vehicle 18*a* in the vehicle consist 12 to a second vehicle 18*b* in the vehicle consist. The network data 16, 30 is transmitted over an existing electrical cable bus 26 that interconnects the first vehicle 18*a* and the second vehicle 18*b*. The existing electrical cable bus 26 is used in the vehicle consist 12 for transferring non-network control information 28 between the first vehicle and the second vehicle. As should be appreciated, this method and system is applicable to communicating data between any of the linked vehicles 18*a*-18*c*, and thereby the terms "first" and "second" vehicle are used to identify respective vehicles in the vehicle consist and are not meant to characterize an order or position of the vehicles unless otherwise specified. That being said, it may be the case that the first and second vehicles are adjacent to and mechanically coupled with one another.

In any of the embodiments set forth herein, the network data may be TCP/IP-formatted or SIP-formatted data. Additionally, each vehicle may include a computer unit, with the computer units 32*a*-32*c* communicating with one another by transmitting the network data, formatted as TCP/IP data or SIP data or otherwise, over the existing electrical cable bus 26, and the computer units thereby forming a computer network, e.g., an Ethernet-type network.

In any of the embodiments set forth herein, the data transmitted over the MU cable bus or other existing electrical cable bus may additionally or alternatively be "high bandwidth" data, meaning data transmitted at average rates of 10 Mbit/sec or greater. (In one aspect, the data is high bandwidth data. In another aspect, the data is network data. In another aspect, the data is both high bandwidth data and network data, referred to herein as "high bandwidth network data," meaning data that is packaged in packet form as data packets and transmitted over the MU cable bus at average rates of 10 Mbit/sec or greater.) This reflects that the communication system (and associated method) are applicable for realizing a high information density communication environment in a locomotive consist, i.e., it is possible to exchange relatively large amounts of data between locomotives in a timely manner. In contrast, "low bandwidth" data is data transmitted at average rages of less than 10 Mbit/sec, and "very low bandwidth" data (a type of low bandwidth data) is data transmitted at average rates of 1200 bits/sec or less.

In any of the embodiments described herein, the existing electrical cable bus or trainline 26 may be an ECP (electronically controlled pneumatic brake) train line. ECP brakes on a train are defined by the Association of American Railroads' 4200 series specifications. This standard describes a 230V DC power line that runs the length of the train (for providing DC power to remote units), a transceiver at 132 kHz that operates on top of the 230V power line, and a communication link (realized over the power line using the transceiver) that adheres to the ANSI/EIA 709.1 and 709.2 protocols. According to the 4200 series specifications, the communication link is used to communicate brake data between railcars for braking control purposes.

Figure 8:
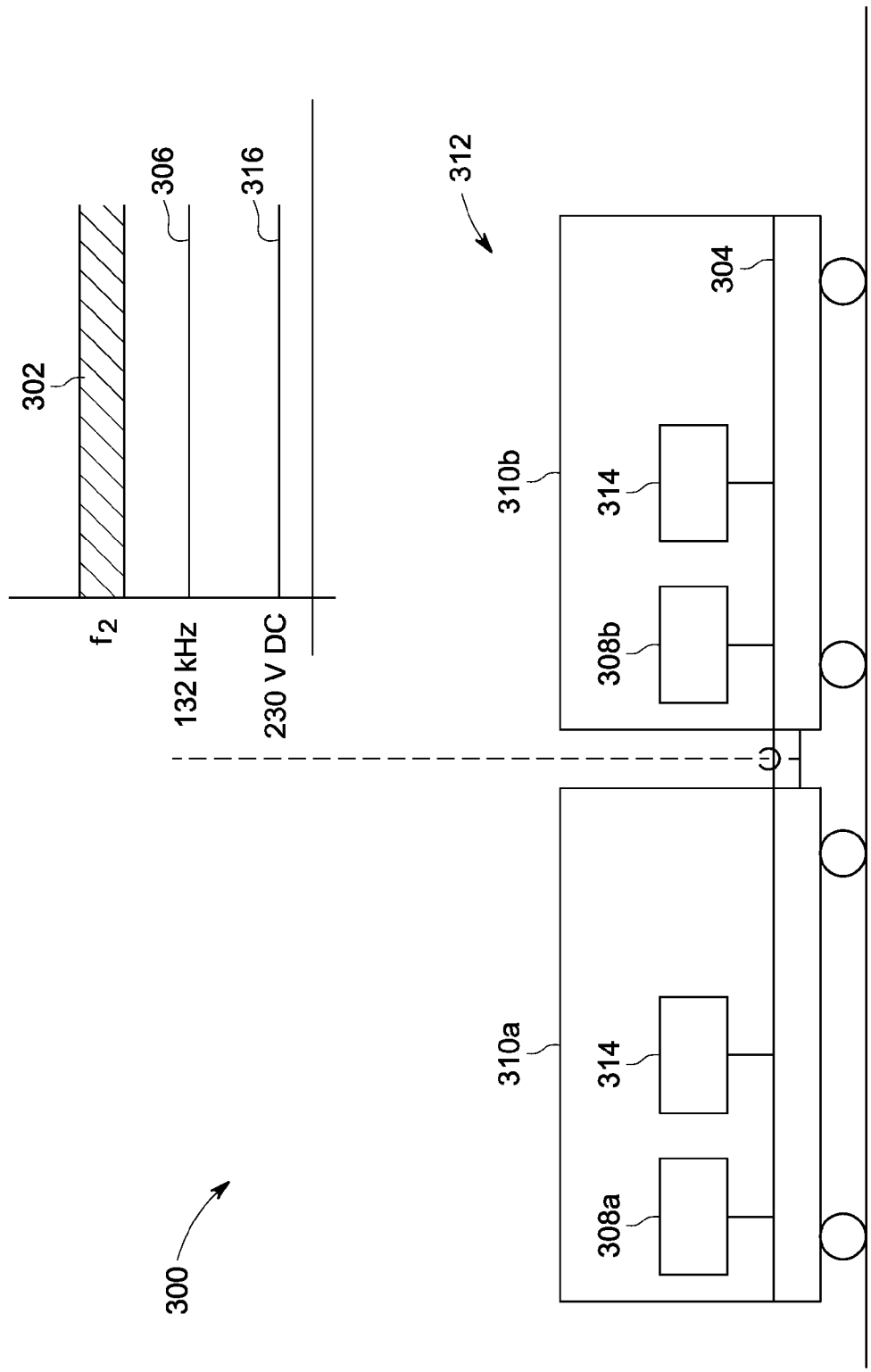
FIG. 8 is a schematic diagram of an embodiment of the communication system implemented in conjunction with an ECP train line.

In an embodiment, with reference to FIG. 8, a system 300 for communicating data in a locomotive consist or other vehicle consist is configured to transmit network and/or high bandwidth data 302 over an ECP train line 304, in a manner orthogonal to ECP brake data 306 transmitted over the ECP train line 304. The ECP brake data 306 may include non-network control information that directs the brakes of the locomotives or vehicles to engage to slow down or stop the train. The system 300 comprises a router transceiver unit 308a, 308b on each of a plurality of vehicles 310a, 310b in a consist 312. (The plurality of so-equipped vehicles may be fewer than all the vehicles in the consist.) On each vehicle, the router transceiver unit 308a, 308b is in addition to an ECP transceiver 314 on the vehicle. Alternatively, an ECP transceiver may be reconfigured to include the functionality of the router transceiver units 308a, 308b. Each router transceiver unit 308a, 308b is electrically connected to the ECP train line 304, and is configured to transmit network and/or high bandwidth data 302 over the ECP train line 304 at one or more frequencies $f_2$ (i) that are different than the 132 kHz frequency of the ECP brake data 306, (ii) that do not interfere with (or receive significant interference from) the ECP brake data 306, and (iii) that do not interfere with (or receive significant interference from) the 230V DC signal 316 present on the ECP train line 304. (That is, the data 302 is orthogonal to the data 306 and DC signal 316.) For example, the network and/or high bandwidth data may be modulated into a carrier wave/RF signal transmitted over the ECP train line at a frequency in the megahertz (MHz) range. The router transceiver units 308a, 308b may be similar to the router transceiver units 34 described above. The embodiment of FIG. 8 may be implemented in conjunction with any of the other embodiments described herein. Also, in the case where certain vehicles in a consist are not equipped with router transceiver units 308a, 308b, the data 302 will nevertheless be transmitted over the ECP train line extending through such vehicles, for eventual reception by vehicles that are equipped with the router transceiver units 308a, 308b.

As should be appreciated, the system 300 establishes a high bandwidth data network that operates superimposed on, and separate from, the 132 kHz communication link that is specified in the 4200 series specifications for ECP brake traffic between the locomotive and the rail cars. In one aspect, the data network is used to communicate non-brake data (e.g., in the form of network and/or high bandwidth data) between vehicles in a consist. Examples of the data that may be transferred include vehicle sensor data indicative of vehicle health, commodity condition data, temperature data, weight data, security data, data as otherwise specified herein, and/or other data. In another aspect, the data network is used to communicate brake data in addition, or instead of, the 132 kHz communication link. The brake data may be in addition to other data transmitted over the data network.

Figure 9:
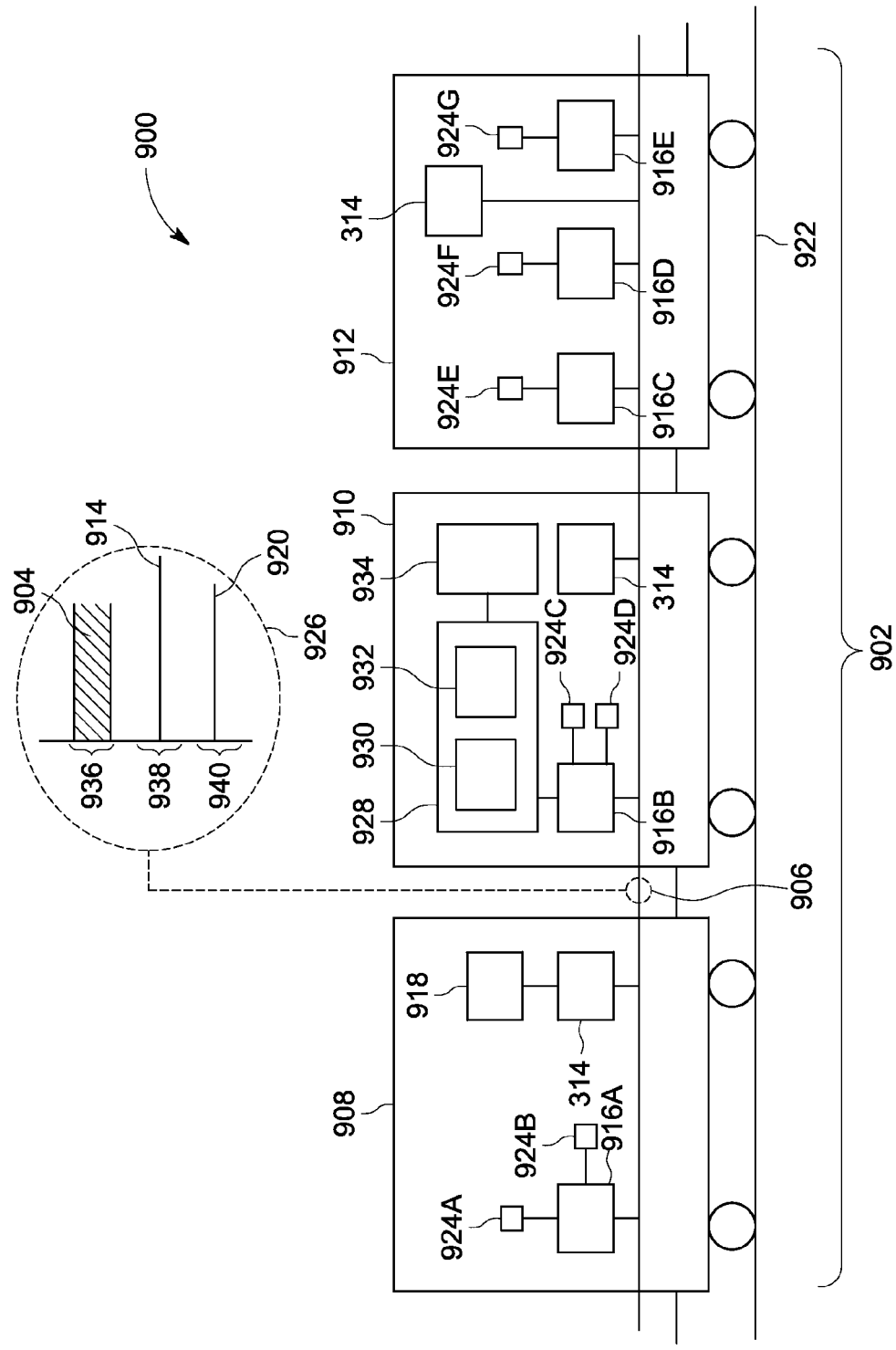
FIG. 9 is a schematic diagram of another embodiment of a communication system 900 for communicating data in a train.

In an embodiment, with reference to FIG. 9, a system 900 for communicating data in a consist 902 is provided. The system 900 transmits network data 904 over a trainline 906 that extends over the entire length, a substantial portion of the length, or at least a majority of the length of the consist 902. The trainline 906 is referred to herein as an ECP trainline or ECP bus, but may include other conductive pathways, busses, cables, or wires that extend between rail vehicles 908, 910, 912 in the consist 902. The network data 904 is communicated on an orthogonal or piggyback channel 936 while other non-network data or signals 914, 920 are communicated on a control channel 938 and/or another channel 940 of the trainline 906, as shown in the detail view 926 in FIG. 9. The detailed view 926 provides a schematic illustration of the data that may be transmitted over, through, or via the trainline 906 on one or more channels 936, 938, 940 of the trainline 906. In one embodiment, the channel 940 represents a DC voltage signal that is applied to the trainline 906. For example, a 230V DC signal may be applied on the trainline 906 and may be represented by the channel 940 even though no data is communicated over the channel 940.

The consist 902 includes several rail vehicles 908, 910, 912 that are coupled with each other to travel over one or more rails of a track 922. The rail vehicles 908, 910, 912 include one or more powered units (such as locomotives capable of self-propulsion) and/or non-powered units or cars (such as passenger or cargo railcars that are not capable of self-propulsion) that are mechanically and electrically coupled together to travel along the track 922.

The system 900 includes router transceiver units 916 (generally referred to as 916 and individually referred to as 916A through 916E) disposed on the rail vehicles 908, 910, 912. The router transceiver units 916 may not be disposed on all rail vehicles in the consist 902. For example, one or more other rail vehicles may be joined to the rail vehicles 908, 910, 912 and included in the consist 902 but may not include a router transceiver unit 916. Alternatively, each rail vehicle in the consist 902 may include at least one router transceiver unit 916. Moreover, a rail vehicle having no router transceiver units 916 may be disposed between two rail vehicles 908, 910, 912 having the router transceiver units 916 in the consist 902.

The rail vehicles 908, 910, 912 also include transceivers 314 on the vehicles 908, 910, 912 and electrically coupled with the trainline 906. Alternatively, one or more of the transceivers 314 may be reconfigured to include the functionality of the router transceivers 308a, 308b. The transceivers 314 communicate non-network control information, such as propulsion control data 914, over the trainline 906. The non-network control information or propulsion control data represents data that is communicated to control tractive and/or braking efforts of the train. A rail vehicle of the train, such as the rail vehicle 908, may include a control module 918, such as a processor, controller, computer, or other logic based device, that transmits the propulsion control data 914. In one embodiment, the propulsion control data 914 may be non-network data, such as ECP brake data that is not communicated in data packets, that is communicated over the trainline 906 to activate or deactivate electrically controlled pneumatic brakes of the rail vehicles 908, 910, 912. Alternatively, the propulsion control data 914 may represent other, non-network data that is not communicated to control tractive and/or braking efforts of the rail vehicles 908, 910, 912.

The router transceiver units 916 may be similar or identical to the router transceiver units 308a, 308b shown in FIG. 8. For example, the router transceiver units 916 communicate the network data 904, such as high bandwidth data and/or low bandwidth data, among each other through the trainline 906. The network data 904 includes data that is packaged in packet form as data packets. The data packets may include a unique network address of a recipient, such as another router transceiver unit 916, a control unit, or another electronic component.

The network data 904, propulsion control data 914, and/or a 230V DC signal 902 may be concurrently transmitted over the same trainline 906 such that the network data 904 is orthogonal to the propulsion control data 914 and the 230V DC signal 902. For example, the propulsion control data 914 may be transmitted on the brake channel 938 while the network data 904 is transmitted over the piggyback channel 936. The brake, piggyback, and the other channels 936, 938, 940 are separate channels such that the data communicated over one channel 936, 938, 940 does not significantly interfere with data communicated over a different channel 936, 938, 940. For example, the network data 904 may be orthogonal to the propulsion control data 914 and/or the 230V DC signal 902 such that the network data 904 can be transmitted at the same time or over the same time period that the propulsion control data 914 is communicated without significantly interfering with the propulsion control data 914.

In order to transmit the network data 904 in a manner that is orthogonal to the propulsion control data 914 and/or the 230V DC signal 902, the router transceiver units 916 transmit the network data 904 such that the network data 904 does not significantly interfere with the propulsion control data 914 or the 230V DC signal 920 and the network data 904 is not significantly interfered with by the propulsion control data 914 or the 230V DC signal 920.

In one embodiment, the router transceiver units 916 transmit the network data 904 orthogonal to the ECP brake data 914 and the 230V DC signal 920 (collectively referred to as "other data") over the trainline 906 by transmitting the network data 904 at one or more frequencies that are different than the frequencies at which the other data is transmitted. For example, if the propulsion control data 306 is transmitted at a frequency of 132 kHz, then the network data 904 may be transmitted at a different frequency, such as 264 kHz, 528 kHz, 1.056 MHz, 2.112 MHz, and the like. Alternatively, a different frequency may be used. The different frequencies may represent the different channels 936, 938, 940. For example, the frequency or range of frequencies over which the non-network brake data 914 is transmitted define the brake channel 938 while the frequency or range of frequencies over which the network data 904 is transmitted may define the piggyback channel 936.

In another embodiment, the network data 904 may be orthogonal to the other data transmitted on the trainline 906 when the network data 904 is transmitted such that the waveform of the network data 904 has a distinguishable shape from the shape of the waveforms of the other data transmitted on the trainline 906. For example, an amplitude, geometric shape, integrated area encompassed by a waveform segment, or other geometric characteristic of the network data 904 may be different from similar geometric characteristics of other data transmitted on the trainline 906 that the network data 904 is distinguishable from and not interfered with by the other data.

As another example, the network data 904 may be orthogonal to other data transmitted on the trainline 906 when transmission of the network data 904 does not change the waveform of the signals containing the other data transmitted on the trainline 906. Similarly, the network data 904 may be orthogonal to the other data when the other data does not change the waveform of the signal(s) containing the network data 904. As a result, the waveform of the signals containing the network data 904 may have the same shape and appearance both during concurrent transmission of the other data and before or after concurrent transmission of the other data.

In one aspect, the trainline 906 is used to communicate the network data 904 in order to communicate non-brake data between the rail vehicles 908, 910, 912. "Non-brake data" includes data other than the propulsion control data 914 and/or the 230V DC signal 920. Examples of the non-brake data that may be transferred as the network data 904 include vehicle sensor data indicative of vehicle health, commodity condition data, temperature data, weight data, security data, data as otherwise specified herein, and/or other data.

In order to obtain the non-brake data, sensors 924 (generally labeled 924 and individually labeled 924A through 924G) are disposed at various spaced apart locations within the rail vehicles 908, 910, 912. The sensors 924 may be passive and/or active sensors that obtain the sensor data. For example, the sensors 924 may include thermal sensors that monitor the temperature of the space inside a rail vehicle 908, 910, 912 and/or the temperature of passengers or commodities stored within the rail vehicle 908, 910, 912. The sensors 924 can include sensors that monitor passenger or commodity condition data. For example, the sensors 924 may include cameras that obtain video or photographs of passengers or commodities, humidity or moisture sensors that measure the relative humidity within the rail vehicles 908, 910, 912, air pressure sensors that measure the atmospheric pressure inside the rail vehicles 908, 910, 912, or gas sensors that measure the concentration of one or more chemical species or constituents within the rail vehicles 908, 910, 912.

Other examples of the sensors 924 include weight sensors that measure the weight or mass of passengers and/or commodities in the rail vehicles 908, 910, 912 or acoustic sensors that detect movement of commodities based on the sounds that may be produced when relatively fragile commodities shift during transit. Additional examples of sensors 924 may include security sensors that monitor access to commodities on the rail vehicles 908, 910, 912, such as cameras, magnetic RFID tags, sensors that detect the opening or closing of doors that lead to the areas where commodities or passengers are located, and other sensors that determine when the commodities or passenger areas are accessed within the corresponding rail vehicle 908, 910, 912 or removed from the rail vehicles 908, 910, 912.

One or more of the sensors 924 may provide vehicle data, such as data that represents the health or status of one or more of the rail vehicles 908, 910, 912. For example, the sensors 924 may include infrared sensors that monitor the temperature of one or more components of the rail vehicles 908, 910, 912 (such as hot box detectors or overheated bearing or axle detectors), Global Positioning Devices (GPS) that detect the geographic location of the rail vehicles 908, 910, 912, battery sensors that measure the status or charge of a battery on one or more of the rail vehicles 908, 910, 912, electrical sensors such as surge sensors, fuse status sensors (e.g., sensors that monitor if a fuse has blown), and the like. Other sensors 924 that measure, detect, or sense vehicle data or information that is representative of whether the rail vehicle 908, 910, and/or 912 needs repairs or maintenance, may be provided.

While the above examples provide some sensors 924 that may be included in the system 900, other sensors 924 not explicitly described herein may be included. For example, any passive or active device that monitors, measures, or detects a quantity, state, or quality of something may be a sensor 924.

As shown in FIG. 9, the sensors 924 in the rail vehicles 908, 910, 912 are communicatively coupled with the router transceiver units 916. For example, the sensors 924 may be electrically coupled with the router transceiver units 916 by one or more conductive busses, cables, wires, and the like. Alternatively, one or more of the sensors 924 may be communicatively coupled with a router transceiver unit 916 by a wireless network connection. With respect to the rail vehicles 908, 910, each of the set of multiple sensors 924a, 924b and the set of multiple sensors 924c, 924d is coupled with a single router transceiver unit 916a, 916b, respectively. For example, multiple sensors 924 may be coupled with a centralized router transceiver unit 916 disposed in the same rail vehicle 908, 910, 912 as the sensors 924. The centralized router transceiver unit 916a, 916b controls which of the sensors 924a, 924b, 924c, 924d that are coupled with the router transceiver 916a, 916b communicates sensor data on the propulsion control line 906. With respect to the rail vehicle 912, each sensor 924e, 924f, 924g is coupled with a single router transceiver unit 916c, 916d, 916e.

The sensors 924 obtain sensor data and communicate the sensor data to the router transceiver units 916 to which the respective sensors 924 are joined. The router transceiver units 916 communicate the sensor data over the trainline 906 between the rail vehicles 908, 910, 912. In one embodiment, the sensor data obtained by several or all of the sensors 924 is communicated over the trainline 906 to a control unit 928 disposed on the rail vehicle 910. Alternatively, the control unit 928 may be disposed on another rail vehicle 908, 912. The rail vehicle 908, 910, 912 in which the control unit 928 is disposed may be referred to as the data hub vehicle.

The control unit 928 is an electrical component or device that receives sensor data from the sensors 924. The control unit 928 includes a processing module 930 and a tangible and non-transitory computer readable storage medium, such as a memory 932. The processing module 930 may be embodied in a logic based device, such as a computer processor, microprocessor, controller, microcontroller, and the like (collectively referred to as "processor"), that operates based on one or more sets of instructions (such as software applications) stored on the memory 932. The memory 932 may be embodied in one or more computer hard drives, ROM devices, RAM devices, EEPROM devices, and the like.

The processing module 930 receives the sensor data and may arbitrate communication of sensor data along the trainline 906. For example, the processing module 930 may communicate with the router transceiver units 916 over the trainline 906 to control the sensor data that is transmitted over the trainline 906. The processing module 920 can assign a priority to some sensor data such that the sensor data associated with a higher priority is transmitted before the sensor data having a lower priority.

The processing module 930 can process the sensor data and visually present the sensor data using an output device 934, such as a monitor, printer, speaker, and the like. Alternatively, the processing module 930 may collect the sensor data and communicate the sensor data to another rail vehicle 908, 912 via the trainline 906. The processing module 930 may periodically transmit control instructions to one or more of the sensors 916 in order to direct the sensors 916 to obtain sensor data and report the acquired sensor data back to the processing module 930. Alternatively, the processing module 930 may respond to input from an operator to direct one or more of the sensors 916 to obtain the sensor data.

The control unit 928 acts as a centralized network hub for the collection of sensor data in one embodiment. A train having several connected rail vehicles 908, 910, 912 may include one or more control units 928. For example, a train may have a single control unit 928 that receives, arbitrates, acquires, processes, and/or presents the sensor data from the sensors 916 disposed along all or substantially all of the rail vehicles 908, 910, 912 in the train. Alternatively, a train may have several control units 928 disposed in one or more rail vehicles 908, 910, 912 of the train. Each control unit 928 may be associated with a subset of the sensors 916 on the train such that different control units 928 receive sensor data from different overlapping or non-overlapping subsets of the sensors 916.

In another embodiment, the router transceiver units 916 may be coupled to another cable bus, such as an MU cable bus. For example, instead of transmitting sensor data over the trainline 906, the router transceiver units 916 may transmit the sensor data over the MU cable bus 26 described above. Alternatively, one or more of the router transceiver units 916 and/or the control unit 928 may be coupled to two or more cable busses extending along the rail vehicle. For example, one or more router transceiver units 916 and/or the control unit 928 may be coupled with an trainline that extends along all or substantially all of the train and with an MU cable bus that extends along a consist of the train, where the consist includes a subset of the rail vehicles in the train. Such a router transceiver unit 916 and/or control unit 928 may be referred to as a bridging router transceiver unit 916 or a bridging control unit 928 (collectively referred to as a "bridging unit") because the router transceiver unit 916 or control unit 928 can provide a communication bridge between the two cable busses. For example, the bridging unit may receive sensor data communicated along an MU cable bus and transmit the sensor data to another router transceiver unit 916 on the trainline, and vice-versa.

Figure 10:
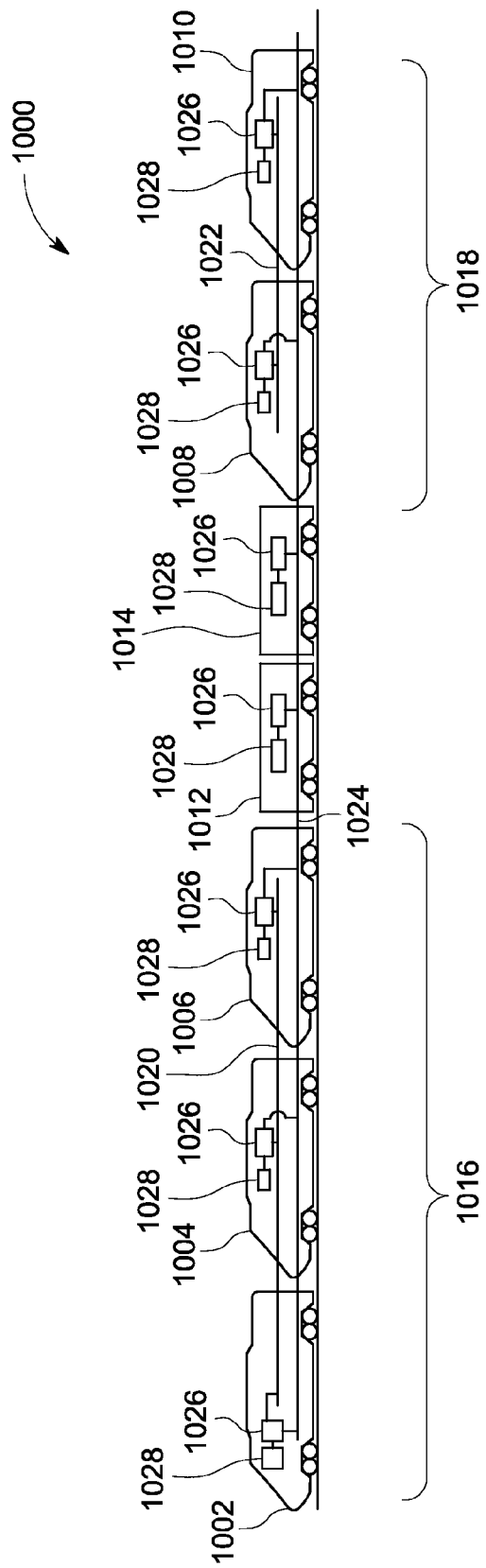
FIG. 10 is a schematic illustration of one embodiment of a multi-consist train.

FIG. 10 is a schematic illustration of one embodiment of a multi-consist train 1000. The train 1000 includes several powered rail vehicles 1002, 1004, 1006, 1008, 1010 connected with several non-powered rail vehicles 1012, 1014. As described above, "powered" rail vehicles may include rail vehicles that are capable of self propulsion, such as locomotives. "Non-powered" rail vehicles include railcars and other rail vehicles that are incapable of self propulsion, such as railcars for passengers or storing commodities.

The powered rail vehicles 1002, 1004, 1006 are coupled with each other and arranged into a lead consist 1016 and the powered rail vehicles 1008, 1010 are coupled with each other and arranged into a trail consist 1018. The powered rail vehicles 1002, 1004, 1006 of the lead consist 1016 are electrically coupled with each other by a lead MU cable 1020 while the powered rail vehicles 1008, 1010 of the trail consist 1018 are electrically coupled with each other by a trail MU cable 1022. The illustrated locations of the MU cables 1020, 1022 are provided merely as examples to indicate that the MU cables 1020, 1022 couple the powered rail vehicles of different consists and that the MU cables 1020, 1022 are not directly coupled with each other. For example, the MU cable 1020 does not contact or mate with the MU cable 1022 and the MU cables 1020, 1022 are separated from each other by a plurality of rail vehicles 1012, 1014. The MU cables 1020, 1022 may be separated by one or more powered and/or non-powered rail vehicles, or by one or more consists having other MU cables.

The powered and non-powered rail vehicles of the train 1000 are coupled with each other by a trainline 1024 that extends along all or substantially all of the train 1000. For example, the trainline 1024 may be an ECP trainline that extends through all of the rail vehicles 1002, 1004, 1006, 1008, 1010, 1012, 1014 but not from the outermost front end to the outermost rear end of the train 1000.

The train 1000 includes router transceiver units 1026 and sensors 1028 coupled to the router transceiver units 1026 in various locations along the train 1000. The sensors 1028 may be similar to the sensors 924 (shown in FIG. 9) and can obtain sensor data. The router transceiver units 1026 may be similar to the router transceiver units 916 (shown in FIG. 9) and can communicate the sensor data on the trainline 1024 and/or the MU cables 1020, 1022. As shown in FIG. 10, the router transceiver units 1026 in the lead powered units 1002, 1004, 1006, 1008, 1010 may be coupled to both the trainline 1024 and one of the MU cables 1020, 1022. Alternatively, one or more of the router transceiver units 1026 in the lead powered units 1002, 1004, 1006, 1008, 1010 may be coupled to the trainline 1024 or one of the MU cables 1020, 1022.

The MU cables 1020, 1022 are used to communicate intra-consist sensor data and the trainline 1024 is used to communicate non-consist sensor data and/or inter-consist sensor data. "Intra-consist sensor data" includes sensor data that is communicated within a single consist, or along one of the MU cables 1020, 1022 between the powered units 1002, 1004, 1006, 1008, 1010 of the corresponding consist 1016, 1018. In one embodiment, intra-consist sensor data is sensor data that is communicated within a consist 1016 or 1018 and excludes sensor data that is communicated outside of the consist 1016 or 1018 over the trainline 1024. "Inter-consist sensor data" includes sensor data that is communicated between two or more different consists. For example, inter-consist sensor data may be sensor data that is communicated from the consist 1016 to the consist 1018 over the trainline 1024.

"Non-consist sensor data" includes sensor data that is obtained by one or more sensors 1028 located outside of the consists 1016, 1018. For example, the sensor data acquired by the sensors 1028 of the non-powered rail vehicles 1012, 1014 may be non-consist sensor data. Alternatively, non-consist sensor data may be defined with reference to a particular consist 1016 or 1018. For example, with respect to the consist 1016, non-consist sensor data may include sensor data that is obtained by one or more sensors 1028 disposed on the rail vehicles 1008, 1010, 1012, 1014 that are not included in the consist 1016. With respect to the consist 1018, the non-consist sensor data may include sensor data that is obtained by one or more sensors 1028 disposed on the rail vehicles 1002, 1004, 1006, 1012, 1014 that are not included in the consist 1018.

The intra-consist data and/or inter-consist data may be obtained by one or more of the sensors 1028 within the consists 1016, 1018 and communicated by one or more of the router transceiver units 1026. For example, the intra-consist sensor data can be transmitted by one or more of the router transceiver units 1026 coupled with the MU cable 1020, 1022 of the consist 1016, 1018 and the inter-consist sensor data can be transmitted by one or more of the router transceiver units 1026 that is coupled with the trainline 1024.

As described above, one or more router transceiver units 1026 may be a bridging router transceiver unit that is coupled with the trainline 1024 and an MU cable 1020 or 1022. The bridging router transceiver unit can receive intra-consist sensor data from the consist 1016 along the MU cable 1020 and convert the intra-consist sensor data to inter-consist sensor data by transmitting the sensor data to the other consist 1018 along the trainline 1024. Similarly, the bridging router transceiver unit can receive intra-consist sensor data from the consist 1018 along the MU cable 1022 and convert the intra-consist sensor data to inter-consist sensor data by transmitting the sensor data to the other consist 1016 along the trainline 1024. A bridging router transceiver unit can receive non-consist sensor data along the trainline 1024 and convert the non-consist sensor data to intra-consist sensor data by transmitting the sensor data to the consist 1016 or the consist 1018 along the corresponding MU cable 1020 or 1022.

In one aspect, the communication of sensor data over a trainline is performed independent of the data transmissions over one or more MU cables in a train. For example, the sensor data may be transmitted over the trainline without interfering with or relying on the communication of data over the MU cables. As another example, network data may be communicated over the trainline outside of consists in a train and is not limited to communication within a single consist.

The communication of data over a trainline allows communication between locomotives or other powered rail vehicles disposed in different consists. For example, a first locomotive or other powered rail vehicle in a lead consist may communicate data with a second locomotive or other powered rail vehicle in a trail consist over the trainline. The first and second locomotives or powered rail vehicles may be able to communicate the data even though the locomotives or powered rail vehicles are separated from each other by a plurality of non-powered rail vehicles, such as freight or cargo cars.

As described herein, both MU cables and ECP trainlines in a single train may be used to "piggyback" communication of data on the cables and lines over the communication of other data. In one embodiment, data may be transmitted on an MU cable in addition to, or piggybacking, the communication of the low bandwidth data that is transmitted on an existing channel or frequency of the MU cable. Data also may be communicated on a trainline in the same train in addition to, or piggybacking, the transmission of data that is transmitted on an existing channel or frequency of the trainline. As a result, four or more channels may be used to communicate data with in the train, namely, at least respective two channels on each of the MU cable and the trainline, with a channel representing a different frequency and/or a different signal waveform of data. For example, while brake data may continue to be communicated on an existing trainline and control information may continue to be communicated on an existing MU cable, additional data, such as sensor data may be piggybacked on each of the trainline and the MU cable to provide four channels of data communications (e.g., a brake data channel and non-brake data channel on the trainline and a control information channel and a non-control information channel on the MU cable). These four or more channels may be used to concurrently transmit information and/or data. Thus, in one embodiment, a method comprises (i) transmitting first, high-bandwidth network data over an MU cable bus, (ii) transmitting second, low-bandwidth or very-low bandwidth data over the MU cable bus, (iii) transmitting third, high-bandwidth data over an ECP trainline, and/or (iv) transmitting fourth, low-bandwidth or very-low bandwidth data over the ECP trainline. The first through fourth data may be transmitted concurrently or at different times; the first and second data may be orthogonal to one another, and the third and fourth data may be orthogonal to one another.

Another embodiment described herein relates to a method for communicating data in a train having two or more spaced apart consists. The method includes transmitting network data as intra-consist data between locomotives or powered rail vehicles within a first consist. The network data may be transmitted over an MU cable of the first consist that also is used to communicate control information between the locomotives or powered rail vehicles of the first consist. The method may also include transmitting network data as inter-consist data between locomotives or powered rail vehicles in two different, spaced apart consists. The network data may be transmitted over an ECP trainline that couples the first consist with a second consist and extends between one or more intermediate rail vehicles, such as a plurality of non-powered rail vehicles between the first and second consists. The network data can be communicated from a first locomotive in the first consist to a second locomotive in the second consist over the ECP trainline.

In one embodiment, a system for communicating data in a train is provided. The system includes at least one respective router transceiver unit positioned in each of at least two rail vehicles of the train. Each router transceiver unit is coupled to a trainline that extends between the rail vehicles. The trainline is an existing cable bus used in the train for transferring propulsion control data between the rail vehicles that controls at least one of tractive effort or braking effort of the rail vehicles. The router transceiver units are configured to communicate network data over the trainline.

In one aspect, the train may be retrofitted to include the system having the router transceiver units coupled with the trainline. For example, an existing train having an existing trainline may be retrofitted with the router transceiver units to permit the communication of network data as inter-consist data or intra-consist data along the trainline in a manner that does not significantly interfere with non-network control information that is normally transmitted using the trainline.

In one aspect, the router transceiver units are configured to communicate the network data over the trainline such that the network data is orthogonal to the propulsion control data on the trainline.

In another aspect, the router transceiver units are configured to communicate the network data as high bandwidth network data.

In another aspect, the router transceiver units are configured to communicate the network data as low bandwidth network data.

In another aspect, the trainline is an Electrically Controlled Pneumatic (ECP) trainline and the propulsion control data is ECP brake data.

In another aspect, the system also includes a control unit disposed on a data hub vehicle that differs from the at least two rail vehicles having the router transceiver units. The control unit is communicatively coupled with the trainline to receive the network data from the router transceiver units.

In another aspect, the system also includes a plurality of sensors disposed along the train and communicatively coupled with the router transceiver units. The sensors are configured to obtain sensor data and the router transceiver units are configured to transmit the sensor data to the control unit via the trainline.

In another aspect, the router transceiver units are disposed on different locomotives in a common consist of the rail vehicle and the router transceiver units communicate the network data between the locomotives over the trainline.

In another aspect, the router transceiver units are disposed on different locomotives in two different consists of the train and communicate the network data between the different consists over the trainline, where the two different consists are spaced apart from one another by at least one non-powered rail vehicle.

In another embodiment, a method for communicating data in a train is provided. The method includes transferring non-network control information over a trainline that extends along the train in order to control at least one of tractive effort or braking effort of the train. The method also includes transmitting network data between different rail vehicles of the train that are coupled with the trainline. The network data is transmitted over the trainline.

In one aspect, the transmitting step includes transmitting the network data orthogonal to the non-network control information.

In another aspect, the transmitting step includes transmitting the network data over the trainline as high bandwidth network data.

In another aspect, the transmitting step includes transmitting the network data over the trainline as low bandwidth network data.

In another aspect, the trainline is an Electrically Controlled Pneumatic (ECP) trainline, and the transferring step includes transferring ECP brake data over the ECP trainline and the transmitting step includes transmitting the network data over the ECP trainline.

In another aspect, the transmitting step includes transmitting the network data to a control unit of a data hub vehicle over the trainline.

In another aspect, the method also includes obtaining sensor data as the network data and communicating the sensor data to the control unit over the trainline.

in another aspect, the transmitting step includes transmitting the network data as intra-consist data that is transmitted between the rail vehicles of a common consist of the train.

In another aspect, the transmitting step includes transmitting the network data as inter-consist data that is transmitted between the rail vehicles in different consists of the train, where the different consists each comprise a respective plurality of locomotives and the consists are spaced apart from one another by at least one non-powered, rail vehicle.

In another embodiment, a system for communicating within a train is provided. The system includes first and second router transceiver units. The first router transceiver unit is disposed on a first rail vehicle of the train. The second router transceiver unit is disposed on a different, second rail vehicle of the train. The first and second router transceiver units are configured to be coupled with a trainline extending along the train between the first and second rail vehicles. The first and second router transceiver units are configured to transmit non-network control information related to operation of the train. The first and second router transceiver units are configured to communicate network data over the trainline that is orthogonal to the non-network control information.

In another aspect, the first and second router transceiver units are configured to be coupled with an Electrically Controlled Pneumatic (ECP) line of the train and to transmit the non-network control information and the network data over the ECP brake line with the non-network control information used to control activation of brakes of the train.

In another aspect, the first and second router transceiver units are disposed in different locomotives of a common consist and are configured to transmit intra-consist network data between each other on the trainline.

In another aspect, the first and second router transceiver units are disposed in different locomotives of different consists of the train, the first and second router transceiver units configured to transmit inter-consist network data between the different consists, where the different consists are spaced apart from one another by at least one non-powered rail vehicle.

Another embodiment relates to a system for communicating data in a train. The system includes a router transceiver unit configured for coupling to a trainline that extends between rail vehicles of a train. The trainline is an existing cable bus used in the train for transferring propulsion control data between the rail vehicles: the propulsion control data controls at least one of tractive effort or braking effort of the rail vehicles, that is, at least one of tractive effort or braking effort of the rail vehicles is controlled based on the propulsion control data. The router transceiver unit is configured to communicate network data over the trainline (e.g., high-bandwidth network data), when connected to the trainline. The router transceiver unit is configured to communicate the network data over the trainline such that the network data is orthogonal to the propulsion control data on the trainline. The trainline may be an ECP trainline, and the propulsion control data may be ECP brake data.

In another embodiment, the system for communicating data in a train includes a first router transceiver unit deployed in a first rail vehicle in the train and a second router transceiver unit deployed in a second rail vehicle in the train. Each router transceiver unit is connected to a trainline that extends between rail vehicles of the train, e.g., the trainline extends at least between the first and second raile vehicles. The rail vehicles may be non-contiguous (not attached to one another) and/or they may be different locomotives in different consists in the train, the consists being separated from one another by at least one non-locomotive rail vehicle. The trainline is an existing cable bus used in the train for transferring propulsion control data between the rail vehicles; the propulsion control data controls at least one of tractive effort or braking effort of the rail vehicles. The router transceiver units are configured to communicate network data (e.g., high-bandwidth network data) over the trainline to one another. The router transceiver units are configured to communicate the network data over the trainline such that the network data is orthogonal to the propulsion control data on the trainline. The trainline may be an ECP trainline, and the propulsion control data may be ECP brake data.

Another embodiment relates to a system for communicating within a train. The system includes a first router transceiver unit configured to be coupled with a trainline that extends along the train between different rail vehicles of the train. The first router transceiver unit is configured to communicate non-network control information, related to operation of the train, over the trainline. The first router transceiver unit is further configured to communicate network data over the trainline, which is orthogonal to the non-network control information. In another embodiment, for use in operation, the first router transceiver unit is deployed on a first rail vehicle of the train, and is connected to the trainline. A second router transceiver unit, similar in functional operation/capability to the first router transceiver unit, is deployed on a different, second rail vehicle of the train, and is connected to the trainline. The first and second router transceiver units communicate with one another over the trainline, by transmitting and receiving non-network control information and network data over the trainline. In various embodiments: the network data is high-bandwidth network data; and/or the trainline is an ECP trainline, and the non-network control information is ECP brake information/data.

Another embodiment relates to a system for data communication. The system includes a first router transceiver module, deployable for connection to an MU cable bus in a train, and a second router transceiver module, deployable for connection to an ECP trainline in a train. The first router transceiver module is configured to transmit and receive first, high-bandwidth network data (or other data) over the MU cable bus, in a manner orthogonal to second, low-bandwidth or very-low bandwidth data that is transmitted over the MU cable bus. The second router transceiver module is configured to transmit and receive third, high-bandwidth data (or other data) over the ECP trainline, in a manner orthogonal to fourth, low-bandwidth or very-low bandwidth data that is transmitted over the ECP trainline. "Module" refers to a combination of software elements (e.g., instructions executable by a processor for carrying out one or more functions according to the instructions) and/or hardware elements (e.g., electronics) configured for carrying out the indicated function. In an embodiment, the first router transceiver module and the second router transceiver module are housed in a common housing.

Figure 11:
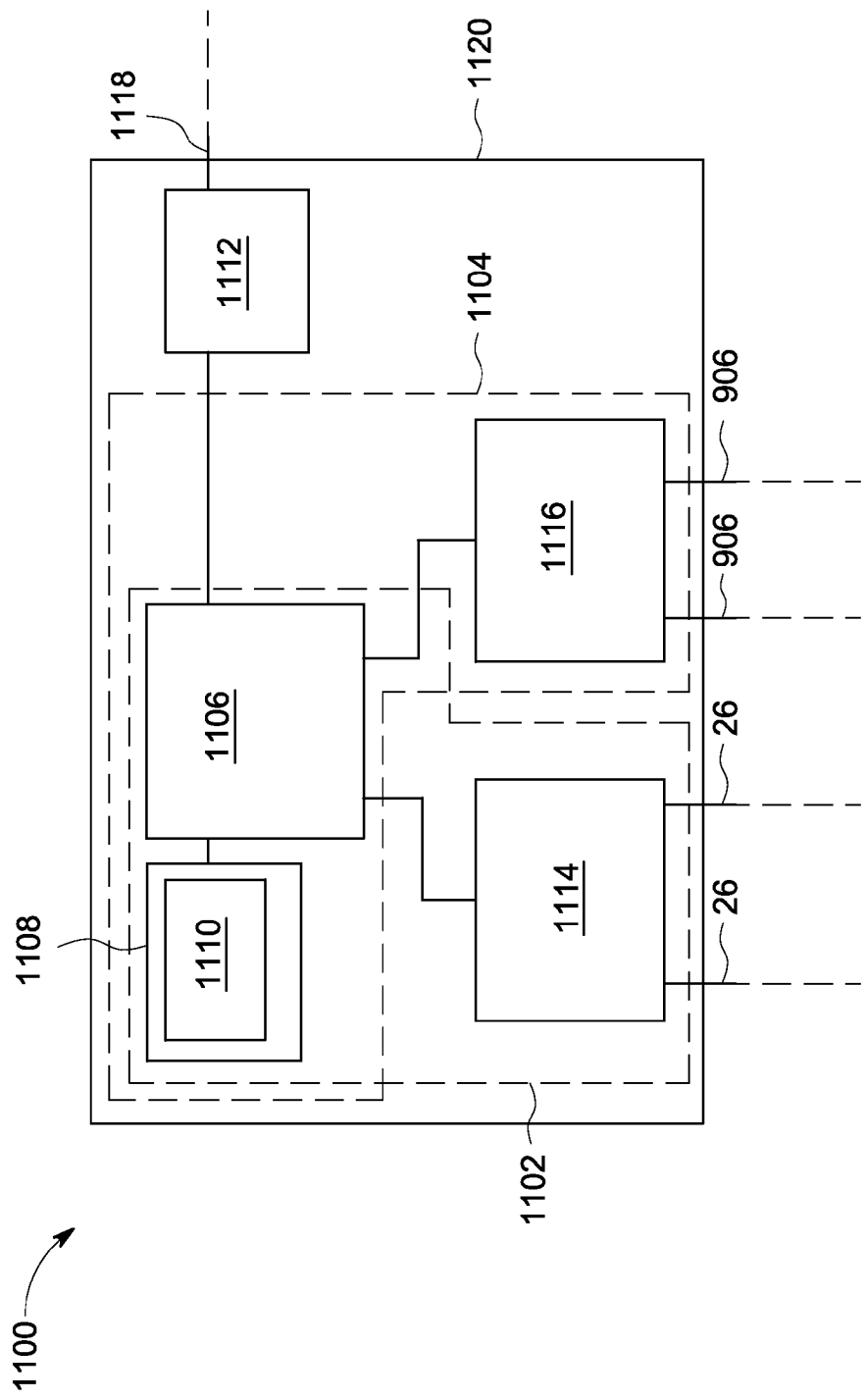
FIG. 11 is a schematic illustration of a communication system, according to another embodiment.

One example of a system for data communication 1100 is shown in FIG. 11. The system 1100 includes a first router transceiver module 1102, deployable for connection to an MU cable bus 26 in a train, and a second router transceiver module 1104, deployable for connection to an ECP trainline 906 in a train. The first router transceiver module 1102 is configured to transmit and receive first, high-bandwidth network data (or other data) over the MU cable bus 26, in a manner orthogonal to second, low-bandwidth or very-low bandwidth data that is transmitted over the MU cable bus. The second router transceiver module 1104 is configured to transmit and receive third, high-bandwidth data (or other data) over the ECP trainline 906, in a manner orthogonal to fourth, tow-bandwidth or very-low bandwidth data that is transmitted over the ECP trainline. The system 1100 further includes a processor 1106, memory 1108, software 1110 stored in the memory 1108, and a network adapter module 1112. The first router transceiver module 1102 includes an MU signal modulator device 1114, which is controlled by the processor 1106 according to a first portion of the software 1110. The MU signal modulator device is electrically connectable to the MU cable bus. The second router transceiver module 1104 includes an ECP signal modulator device 1116, which is controlled by the processor 1106 according to a second portion of the software 1110. The ECP signal modulator device 1116 is electrically connectable to the ECP trainline. The network adapter module 1112 is electrically connected to the modules 1102, 1104, and is electrically connectable to a network data line (e.g., Ethernet line) 1118 (such as a line connected to a computer or other electronic device). The processor, memory, network adapter module, and modules 1102, 1104 are housed in a housing 1120.

For operation, the system 1100 is deployed on a rail vehicle. The first router transceiver module 1102 is connected to the MU cable bus. The second router transceiver module 1104 is connected to the ECP trainline. The network adapter module 1112 is connected to the network data line 1118. In operation, the first router transceiver module 1102 transmits first, high-bandwidth network data over the MU cable bus. In particular, the processor 1106, according to the first portion of the software, controls the MU signal modulator device 1114 and the network adapter module 1112 for receiving the first, high-bandwidth network data over the MU cable bus 26 and transmitting the first, high-bandwidth network data over the network data line 1118, and/or for receiving the first, high-bandwidth network data over the network data line and transmitting the first, high-bandwidth network data over the MU cable bus. The second router transceiver module 1104 transmits third, high-bandwidth network data over the ECP trainline. In particular, the processor 1106, according to the second portion of the software, controls the ECP signal modulator device 1116 and the network adapter module 1112 for receiving the third, high-bandwidth network data over the ECP trainline and transmitting the third, high-bandwidth network data over the network data line 1118, and/or for receiving the third, high-bandwidth network data over the network data line and transmitting the third, high-bandwidth network data over the ECP trainline. The ECP signal modulator device 1116 and the MU signal modulator device 1114 may be integrated into one electronics unit combining functionality for modulating high-bandwidth network data on ECP trainlines and MU cable buses. Other respective systems 1100 may be deployed on other rail vehicles for communicating data between vehicles.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present invention will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method for communicating data in a vehicle consist, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A router transceiver unit comprising:
    a network adapter module configured for electrical connection to a network interface unit, wherein the network adapter module is configured to receive high bandwidth network data from the network interface unit; and
    a signal modulator module electrically connected to the network adapter module and comprising a physical layer and a data link layer, the signal modulator module comprising an electrical output and internal circuitry, wherein the electrical output is configured for electrical connection to a trainline, and wherein the internal circuitry is configured to receive the high bandwidth network data from the network adapter module, to convert the high bandwidth network data into modulated network data in a form suitable for transmission over the trainline, and to transmit the modulated network data, comprising the high bandwidth network data, over the trainline;
    wherein the data link layer comprises an application protocol convergence layer, a logical link control layer, and a medium access control layer, wherein the application protocol convergence layer is configured to accept network frames of the high bandwidth network data from the network adapter module and to encapsulate the network frames into medium access control service data units, the logical link control layer is configured to receive the medium access control service data units from the application protocol convergence layer for at least one of encryption, aggregation, segmentation, or automatic repeat-request, and the medium access control layer is configured to schedule channel access; and
    wherein the physical layer comprises a physical coding layer, a physical medium attachment layer, and a physical medium dependent layer, wherein the physical coding layer is configured to generate physical layer headers, the physical medium attachment layer is configured for scrambling and forward error correction coding, and the physical medium dependent layer is configured for interfacing with the trainline and for the conversion of the high bandwidth network data into the modulated network data using orthogonal frequency-division multiplexing (OFDM) modulation.

2. The router transceiver unit of claim 1, wherein electrical wires of the trainline are incapable of carrying data at a transmission rate of more than a very-low bandwidth unless the data is converted by the signal modulator module into the high bandwidth network data.

3. The router transceiver unit of claim 1, wherein the trainline is a locomotive multiple unit (MU) cable bus.

4. The router transceiver unit of claim 3, wherein the MU cable bus comprises copper wires that are from 12 to 14 gauge for carrying electrical signals.

5. The router transceiver unit of claim 3, wherein electrical wires of the MU cable bus are incapable of carrying data at a transmission rate of more than a very-low bandwidth unless the data is converted by the signal modulator module into the high bandwidth network data.

6. The router transceiver unit of claim 3, wherein the MU cable bus comprises a plurality of discreet electrical wires, and wherein the internal circuitry of the signal modulator module is configured to transmit the modulated network data, comprising the high bandwidth network data, over a single one of the discreet electrical wires.

7. The router transceiver unit of claim 6, wherein the discreet electrical wires comprise respective copper wires that are from 12 to 14 gauge.

8. The router transceiver unit of claim 1, wherein the trainline comprises copper wires that are from 12 to 14 gauge for carrying electrical signals.

9. The router transceiver unit of claim 1, wherein the network adapter module comprises a CAT-5E receptacle for connection to the network interface unit with a CAT-5E cable and receipt of the high bandwidth network data from the network interface unit over the CAT-5E cable.

10. The router transceiver unit of claim 1, wherein the trainline comprises a plurality of discreet electrical wires, and wherein the internal circuitry of the signal modulator module is configured to transmit the modulated network data, comprising the high bandwidth network data, over a single one of the discreet electrical wires.

11. The router transceiver unit of claim 10, wherein the discreet electrical wires comprise respective copper wires that are from 12 to 14 gauge.

12. A router transceiver unit comprising:
a main bus;
a control unit comprising a controller and a control unit bus, wherein the controller is electrically connected to the control unit bus for communications over the control unit bus;
a switch configured to process and route network data, wherein the switch interfaces the control unit with the main bus;
a network interface portion electrically connected to the main bus and comprising an Ethernet transceiver circuit and a network port portion electrically connected to the Ethernet transceiver circuit, wherein the network port portion comprises an Ethernet transformer and a receptacle for receiving a network cable; and
a VDSL module comprising a physical interface portion for connection of the VDSL module to the main bus, a VDSL control electrically connected to the physical interface portion, a VDSL analog front end unit electrically connected to the VDSL control, and a VDSL port unit electrically connected to the VDSL analog, front end unit, wherein the VDSL analog front end unit is configured for transceiving modulated network data over a trainline, wherein the VDSL control is configured for at least one of converting or processing the network data for modulation and de-modulation into the modulated network data, and wherein the VDSL port unit comprises transformer circuitry and a connection mechanism for physically and electrically connecting the VDSL module to the trainline.

13. The router transceiver unit of claim 12, wherein the receptacle is a CAT-5E receptacle and the network cable is a CAT-5E cable.

14. The router transceiver unit of claim 12, wherein the trainline is a locomotive multiple unit (MU) cable bus.

15. The router transceiver unit of claim 14, wherein the VDSL module is configured to transceive the modulated network data over the MU cable bus at a high bandwidth.

16. The router transceiver unit of claim 15, wherein the MU cable bus comprises a plurality of discreet electrical wires, and wherein the VDSL module is configured to transceiver the modulated network data at the high bandwidth over a single one of the discreet electrical wires.

17. The router transceiver unit of claim 16, wherein the discreet electrical wires comprise respective copper wires that are from 12 to 14 gauge.

18. The router transceiver unit of claim 12, wherein the VDSL module is configured to transceive the modulated network data over the trainline at a high bandwidth.

19. The router transceiver unit of claim 18, wherein the trainline comprises a plurality of discreet electrical wires, and wherein the VDSL module is configured to transceiver the modulated network data at the high bandwidth over a single one of the discreet electrical wires.

20. The router transceiver unit of claim 19, wherein the discreet electrical wires comprise respective copper wires that are from 12 to 14 gauge.

21. A router transceiver unit comprising:
a network adapter module configured for electrical connection to a network interface unit, wherein the network adapter module is configured to receive high bandwidth network data from the network interface unit; and
a signal modulator module electrically connected to the network adapter module, the signal modulator module comprising an electrical output and internal circuitry, wherein the electrical output is configured for electrical connection to a trainline, and wherein the internal circuitry is configured to receive the high bandwidth network data from the network adapter module, to convert the high bandwidth network data into modulated network data in a form suitable for transmission over the trainline, and to transmit the modulated network data, comprising the high bandwidth network data, over the trainline;
wherein the trainline comprises a plurality of discreet electrical wires, each of the discreet electrical wires comprising a respective copper wire that is from 12 to 14 gauge, and wherein the signal modulator module is configured to transmit the modulated network data, comprising the high bandwidth network data, over a single one of the discreet electrical wires of the trainline.

* * * * *